US012751479B2

(12) United States Patent
Jasiewicz

(10) Patent No.: US 12,751,479 B2
(45) Date of Patent: Oct. 6, 2026

(54) DESTEMMING DEVICES

(71) Applicant: Trick Concepts Inc., Golden Valley, AZ (US)

(72) Inventor: James David Jasiewicz, Golden Valley, AZ (US)

(73) Assignee: TRICK CONCEPTS INC., Golden Valley, AZ (US)

( * ) Notice: Subject to any disclaimer, the term of this patent is extended or adjusted under 35 U.S.C. 154(b) by 207 days.

(21) Appl. No.: 18/524,146

(22) Filed: Nov. 30, 2023

(65) Prior Publication Data

US 2024/0269875 A1 Aug. 15, 2024

Related U.S. Application Data

(60) Provisional application No. 63/444,614, filed on Feb. 10, 2023.

(51) Int. Cl.
*A23N 15/00* (2006.01)
*A01G 3/00* (2006.01)

(52) U.S. Cl.
CPC ........ *A23N 15/00* (2013.01); *A01G 2003/005* (2013.01)

(58) Field of Classification Search
CPC ...... A23N 15/00; A23N 15/02; A23N 15/025; A23N 15/04; A23N 7/00; A23N 4/06; A23L 1/2123; B26D 1/165; B26D 1/0006; B26D 1/045; B26D 7/0006; B26D 7/0633; B26D 7/0683; B26D 2001/0046; A01D 46/00; A01D 46/20; A01D 61/006; A01D 61/02; A01D 45/065; A01G 3/002; A01G 3/0435; A01G 2003/005; A01G 17/023; A01G 17/026; A24B 5/00; A24B 5/16
USPC ............... 460/134; 88/345, 348, 353, 356.3; 99/546, 537, 639, 636; 131/322; 171/27, 171/61; 493/419, 423; 56/27.5, 330
See application file for complete search history.

(56) References Cited

U.S. PATENT DOCUMENTS 356,323 A * 1/1887 Leonard ................ A01D 46/02 460/129
478,592 A * 7/1892 Green .................... A01D 46/02 460/126
517,469 A * 4/1894 Maples .................. A01D 45/10 460/135

(Continued)

FOREIGN PATENT DOCUMENTS

CN 2113602 U * 8/1992
CN 105926047 A * 9/2016 .............. D01B 1/30

(Continued)

OTHER PUBLICATIONS

"Block", Merriam-Webster, https://www.merriam-webster.com/dictionary/block (Year: 2025).*

*Primary Examiner* — Christopher J Sebesta
*Assistant Examiner* — Sunny D Webb
(74) *Attorney, Agent, or Firm* — Lippes Mathias LLP

(57) ABSTRACT

A destemming device includes a housing, a motor, and a belt system configured to fit within the housing. The housing includes at least one cutting aperture. The cutting aperture is formed from a plurality of cutting fingers that have a cutting edge. When a plant stem is pressed or fed into the device, the cutting fingers create a cutting aperture that is sized to conform closely to the plant stem.

20 Claims, 28 Drawing Sheets

(56) References Cited

U.S. PATENT DOCUMENTS

| | | | | | |
|---|---|---|---|---|---|
| 537,056 | A * | 4/1895 | Marsa | A01D 46/02 | 460/129 |
| 773,664 | A * | 11/1904 | Moore | A01F 11/06 | 460/103 |
| 1,321,311 | A * | 11/1919 | Johnson | A23N 4/14 | 99/546 |
| 1,334,162 | A * | 3/1920 | Moltzner | A23N 4/04 | 99/563 |
| 1,338,768 | A * | 5/1920 | Hammerstein | A24B 5/04 | 131/322 |
| 1,447,450 | A * | 3/1923 | Wessel | D01B 1/22 | 19/29 |
| 1,518,349 | A * | 12/1924 | Olson | A24B 5/02 | 131/323 |
| 1,834,762 | A * | 12/1931 | Bjorklund | B26D 3/28 | 156/763 |
| 2,226,206 | A * | 12/1940 | McConnel | A01D 46/02 | 460/126 |
| 2,257,336 | A * | 9/1941 | Feurt | B26F 1/20 | 83/345 |
| 2,407,126 | A * | 9/1946 | Ashlock, Jr. | A23N 4/02 | 99/546 |
| 2,514,120 | A * | 7/1950 | Chenette | A23N 4/04 | 99/551 |
| 2,611,215 | A * | 9/1952 | Johnson | A01G 20/30 | 47/1.01 R |
| 2,882,944 | A * | 4/1959 | Lorenzen | A23N 4/04 | 99/557 |
| 3,654,753 | A * | 4/1972 | Gervais | A01D 45/16 | 56/27.5 |
| 3,962,850 | A * | 6/1976 | Moore | A01D 45/16 | 56/27.5 |
| 4,080,856 | A * | 3/1978 | Shearon | B26D 7/01 | 83/99 |
| 5,316,519 | A * | 5/1994 | Johnson | A01F 12/187 | 460/142 |
| 5,331,980 | A * | 7/1994 | Bailey | A01D 45/16 | 460/134 |
| 7,028,844 | B2 * | 4/2006 | Nelson | A23N 15/00 | 209/142 |
| 10,493,648 | B2 * | 12/2019 | Nakatsu | B26D 1/205 | |
| 10,524,423 | B1 * | 1/2020 | Olson | A01D 45/065 | |
| 10,624,384 | B2 * | 4/2020 | Evans | A24B 5/12 | |
| 11,589,521 | B2 * | 2/2023 | Kolbet | A23N 15/00 | |
| 11,925,941 | B2 * | 3/2024 | Archie | A23N 15/00 | |
| 12,582,043 | B2 * | 3/2026 | Sullivan | A01D 45/065 | |
| 2015/0156967 | A1 * | 6/2015 | Steenland | A01D 46/02 | 460/129 |
| 2016/0374386 | A1 * | 12/2016 | Desmarais | A24B 5/06 | 460/137 |
| 2018/0303033 | A1 * | 10/2018 | Jones | A23N 15/00 | |
| 2019/0124852 | A1 * | 5/2019 | Mathurin | A23N 15/02 | |
| 2021/0007284 | A1 * | 1/2021 | Wilkins | A01F 12/56 | |
| 2026/0060178 | A1 * | 3/2026 | Ramos | A01D 46/02 | |

FOREIGN PATENT DOCUMENTS

| | | | | |
|---|---|---|---|---|
| CN | 108741170 | A * | 11/2018 | A23N 15/00 |
| CN | 113099838 | A * | 7/2021 | A01D 45/065 |
| CN | 113679055 | A * | 11/2021 | A23N 4/02 |
| CN | 113766828 | A * | 12/2021 | A24B 5/06 |
| DE | 1228845 | B * | 11/1966 | A23N 15/025 |
| DE | 2361885 | A1 * | 12/1973 | A01D 46/02 |
| GB | 736092 | A * | 8/1955 | A01D 46/02 |
| GB | 817769 | A * | 8/1959 | A01D 46/02 |
| WO | WO-2010130035 | A1 * | 11/2010 | A23N 15/01 |

* cited by examiner

218

220

280

280

280

280

100

310

310

DESTEMMING DEVICES

CROSS-REFERENCE TO RELATED APPLICATIONS

This application claims priority to U.S. Provisional Patent Application Ser. No. 63/444,614, filed on Feb. 10, 2023, which is incorporated by reference in its entirety.

BACKGROUND

The present disclosure relates to devices and methods for destemming plants. A destemming device, also known as a bucker, a bucking machine, a destemmer, a debudder, etc., is a harvesting machine that separates material such as buds, leaves, flowers, etc. from stems. The use of a destemming device can significantly increase the efficiency of a harvesting operation by eliminating the need for destemming to be performed manually (e.g., with a knife or scissors).

However, significant manual labor is still required to prepare plants for destemming with known destemming devices since the bulk plant material must still be broken down into small enough pieces to fit into dies/cutting apertures at the front of the machine. Additionally, relatively long (e.g., 5 inches) stem sections are required to facilitate proper gripping of the stem within such devices.

It would be desirable to develop new destemming devices and methods which address the aforementioned deficiencies of known buckers.

BRIEF DESCRIPTION

Disclosed herein are destemming devices and methods. Very generally, the devices/buckers have a cutting aperture which is defined by cutting fingers. in some embodiments, the cutting fingers are arranged in one row or as one set of cutting fingers opposite another surface. In some other embodiments, the cutting fingers are arranged as two sets of opposing cutting fingers.

Disclosed in various embodiments are destemming devices comprising a housing; a first support block having a plurality of cutting fingers attached thereto; and a second support block spaced apart from the first support block and also having a plurality of cutting fingers attached thereto. Each cutting finger comprises a base and at least one cutting edge, and is spring-mounted so as to be able to travel relative to the first support block or the second support block. The plurality of cutting fingers on the first support block and the plurality of cutting fingers on the second support block form a cutting aperture.

In particular embodiments, each cutting finger comprises: a plurality of travel shafts extending from the base; and a cross bar joining the plurality of travel shafts, the cross bar being spaced apart from the base and including a spring mount aperture. The first support block or the second support block further comprises, for each given cutting finger in the plurality of cutting fingers: a plurality of corresponding rail apertures through which the plurality of travel shafts of the given cutting finger passes, such that the base and the cross bar of the given cutting finger are on opposite sides of the first support block or the second support block; a corresponding spring mount which passes through the spring mount aperture of the given cutting finger; a corresponding compression spring around the corresponding spring mount; and a corresponding spring cap joined to the distal end of the corresponding spring mount; such that the given cutting finger floats relative to the first support block or the second support block.

Each cutting finger may further comprise a guard extending from the base in the same direction as the plurality of travel shafts.

In addition embodiments, the first support block or the second support block further comprises, for each given cutting finger in the plurality of cutting fingers, a corresponding collar placed between the corresponding spring and the corresponding spring mount.

In some particular embodiments, the at least one cutting edge of each cutting finger is present on a rotating member attached to the base, the member rotating on an axis that passes through the cutting aperture, and the member extending beyond the base. In specific embodiments, the rotating member comprises a plurality of square teeth.

The rotating member of adjacent cutting fingers may be offset from each other and overlap to form openings. The first support block and the second support block may be placed such that the pluralities of cutting fingers float vertically. The cutting edges on the first support block and the second support block may be recessed relative to the housing.

In particular embodiments, the first support block is fixed in place relative to the housing, and the second support block floats relative to the housing.

The destemming device may further comprise a belt system configured to fit within the housing, the belt system comprising: a first belt assembly comprising a first gripper belt; and a second belt assembly comprising a second gripper belt; and at least one motor that is operatively connected to rotate the first gripper belt and the second gripper belt.

In some specific embodiments, the first support block is fixed in place relative to the first belt assembly, and the second support block is fixed in place relative to the second belt assembly. The second support block and the second belt assembly may be attached to a mobile carriage frame which floats relative to the first belt assembly. The housing may further comprise a device frame having a plurality of channels that guide the mobile carriage frame. The device frame may include a fixed crossbar, the fixed crossbar supporting a variable length tool for moving the mobile carriage frame relative to the first belt assembly. For example, the variable length tool can comprise a pneumatic cylinder, or a spring, or a linear actuator.

The second support block may be fixed in place relative to the second belt assembly.

The destemming device may further comprise an activation system for increasing the distance between the first belt assembly and the second belt assembly. The activation system may comprise a foot pedal operatively connected to the second belt assembly, wherein depressing the foot pedal causes the second belt assembly to move towards the first belt assembly, and releasing the foot pedal causes the second belt assembly to move away from the first belt assembly.

In other contemplated embodiments, each cutting finger further comprises a travel shaft extending from the base; and the first support block or the second support block further comprises, for each given cutting finger in the plurality of cutting fingers: a corresponding rail aperture through which the travel shaft of the given cutting finger passes; a corresponding compression spring surrounding the travel shaft; and a corresponding spring cap joined to a distal end of the corresponding travel shaft.

Also contemplated are methods of using a destemming device. A plant stem is fed through the cutting aperture of the destemming device. A belt system within the device can be used to pull the plant stem through the cutting aperture. The cutting aperture removes buds from the plant stem.

The belt system includes a first belt assembly and a second belt assembly. The first belt assembly includes a first plurality of rollers; and a first gripper belt extending around the first plurality of rollers. The second belt assembly includes a second plurality of rollers; and a second gripper belt extending around the second plurality of rollers. The first gripper belt and the second gripper belt define a nip. The cutting aperture is aligned with the nip. The at least one motor is operatively connected to the belt system.

In some embodiments, the first belt assembly is an upper belt assembly and the second belt assembly is a lower belt assembly located vertically below the upper belt assembly.

In some embodiments, the destemming device further includes a slide, a conveyor, and/or a receptacle outside the housing and beneath the cutting aperture.

Disclosed in other embodiments are destemming methods which utilize the destemming device as described herein. The destemming methods generally include inserting a plant stem into the cutting aperture of the destemming device.

These and other non-limiting characteristics of the disclosure are more particularly disclosed below.

BRIEF DESCRIPTION OF THE DRAWINGS

The following is a brief description of the drawings, which are presented for the purposes of illustrating the exemplary embodiments disclosed herein and not for the purposes of limiting the same.

FIG. 8A is a perspective view. FIG. 8B is a front view. FIG. 8C is a side view.

DETAILED DESCRIPTION

Figure 1:
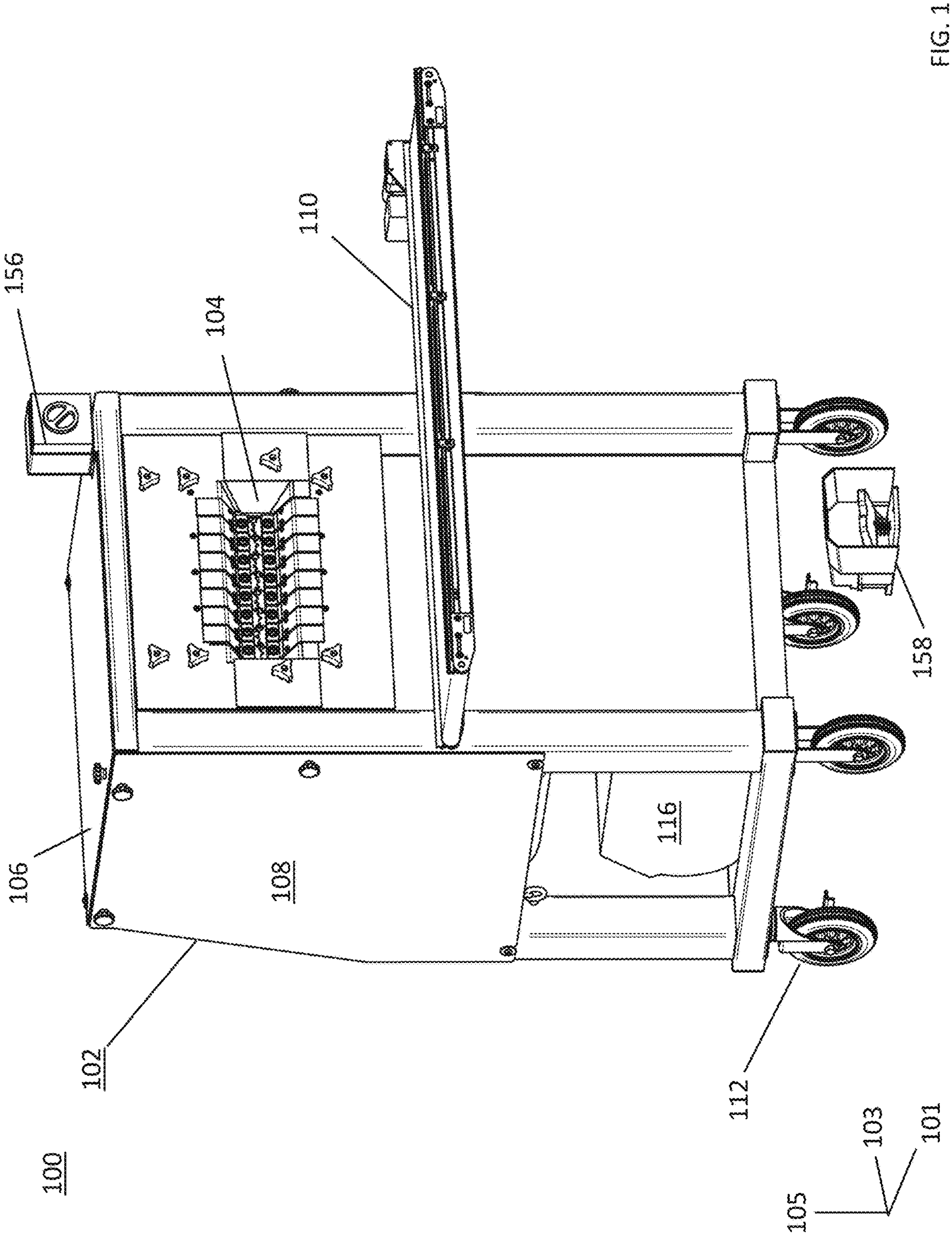
FIG. 1 is a front side perspective view of the exterior of the destemming device or bucker, along with a conveyor belt and a foot pedal.

A more complete understanding of the compositions and methods disclosed herein can be obtained by reference to the accompanying drawings. These figures are merely schematic representations based on convenience and the ease of demonstrating the present disclosure, and are, therefore, not intended to define or limit the scope of the exemplary embodiments.

Although specific terms are used in the following description for the sake of clarity, these terms are intended to refer only to the particular structure of the embodiments selected for illustration in the drawings and are not intended to define or limit the scope of the disclosure. In the drawings and the following description below, it is to be understood that like numeric designations refer to components of like function.

The singular forms "a," "an," and "the" include plural referents unless the context clearly dictates otherwise.

As used in the specification and in the claims, the term "comprising" may include the embodiments "consisting of" and "consisting essentially of." The terms "comprise(s)," "include(s)," "having," "has," "can," "contain(s)," and variants thereof, as used herein, are intended to be open-ended transitional phrases, terms, or words that require the presence of the named ingredients/steps and permit the presence of other ingredients/steps. However, such description should be construed as also describing compositions or processes as "consisting of" and "consisting essentially of" the enumerated ingredients/steps, which allows the presence of only the named ingredients/steps, along with any impurities that might result therefrom, and excludes other ingredients/steps.

Numerical values in the specification and claims should be understood to include numerical values which are the same when reduced to the same number of significant figures and numerical values which differ from the stated value by less than the experimental error of conventional measurement technique of the type described in the present application to determine the value.

All ranges disclosed herein are inclusive of the recited endpoint and independently combinable (for example, the range of “from 2 to 10” is inclusive of the endpoints, 2 and 10, and all the intermediate values).

As used herein, approximating language such as “about” may be applied to modify any quantitative representation that may vary without resulting in a change in the basic function to which it is related. The modifier “about” should also be considered as disclosing the range defined by the absolute values of the two endpoints. For example, the expression “from about 2 to about 4” also discloses the range “from 2 to 4.” The term “about” may refer to plus or minus 10% of the indicated number.

The terms “upper”, “lower”, “upwards”, and “downwards” are generally used to indicate directions opposite from each other relative to a given center, and should not be construed as always requiring, for example, a “lower end” to be closer to ground level than the “upper end”. These terms may change by rotating the structure 180 degrees.

Similarly, the terms “horizontal” and “vertical” are used to indicate directions that are perpendicular from each other. These terms may change by rotating the structure 90 degrees. In addition, these terms should not be construed to require structures to be absolutely parallel or absolutely perpendicular to each other. For example, a first vertical structure and a second vertical structure are not necessarily parallel to each other.

The present disclosure relates to cutting apertures for a destemming device, also known as a bucker, shucker, or destemmer. The bucker is used to remove or separate desirable material, such as leaves and buds, from a plant stem. Conventional buckers have been designed to remove buds from only one stem or a small group of stems at a time. They usually include a faceplate having cutting apertures of different sizes, and the user must manually determine which size aperture the plant stem should be inserted into. Choosing the wrong size aperture reduces product quality. The present disclosure provides cutting apertures that maintain high product quality while also substantially reducing the time and labor needed to harvest a large amount of biomass.

As will be discussed herein, the device/bucker can include a first support block and a spaced-apart second support block, each of which have cutting fingers attached thereto. Each cutting finger includes at least one cutting edge and is spring-mounted so as to be able to travel relative to the first support block or second support block. The cutting fingers form a cutting aperture between the first support block and the second support block. The size and shape of the cutting aperture can change due to the movement of the cutting fingers, permitting the cutting fingers to conform closely to the shape of the plant stem as it is fed through. As will be discussed further herein, only one support block with cutting fingers may also be used, with a suitable cutting/scraping surface on the opposite side of the cutting aperture.

The destemming devices of the present disclosure also utilize a belt system instead of two large, conventional rollers. The belt system includes a first (e.g., upper) belt assembly and a second (e.g., lower) belt assembly. The belt system could also be rotated 90° so that the nip between the belts extends vertically. In vertical nip embodiments, the stem end of the plant matter may be fed through the front or the top of the device. In top-feed systems, destemmed plant matter may be collected from the top of the device manually or via an at least partially automated process. For example, a brush or a wiper may be included with the device. A receptacle for collecting stems may be provided beneath the belt system, either within or external to the housing.

It is generally contemplated that in some embodiments, the second or lower belt assembly and the second support block of the faceplate are fixed relative to each other. The plant can be inserted between the first support block and the second support block. An activation system, such as a foot pedal, can be used to raise the lower belt assembly to grip the stem and close the cutting fingers onto the plant stem. As the stem is pulled through the bucker, the cutting edges in the cutting aperture will scrape against the stem, cutting off leaves and buds which can subsequently be captured. This may permit a whole plant or a large portion of a plant to be stripped off in one pass, and can be used for processing large volumes in a shorter time with acceptable yield.

The cutting apertures of the present disclosure allow the plant to stay spread out as it enters the bucker, rather than becoming compressed as in conventional cutting apertures that have a fixed and constant size. The cutting fingers remove leaves and buds off the stem individually as they are encountered during the feed process.

Figure 2:
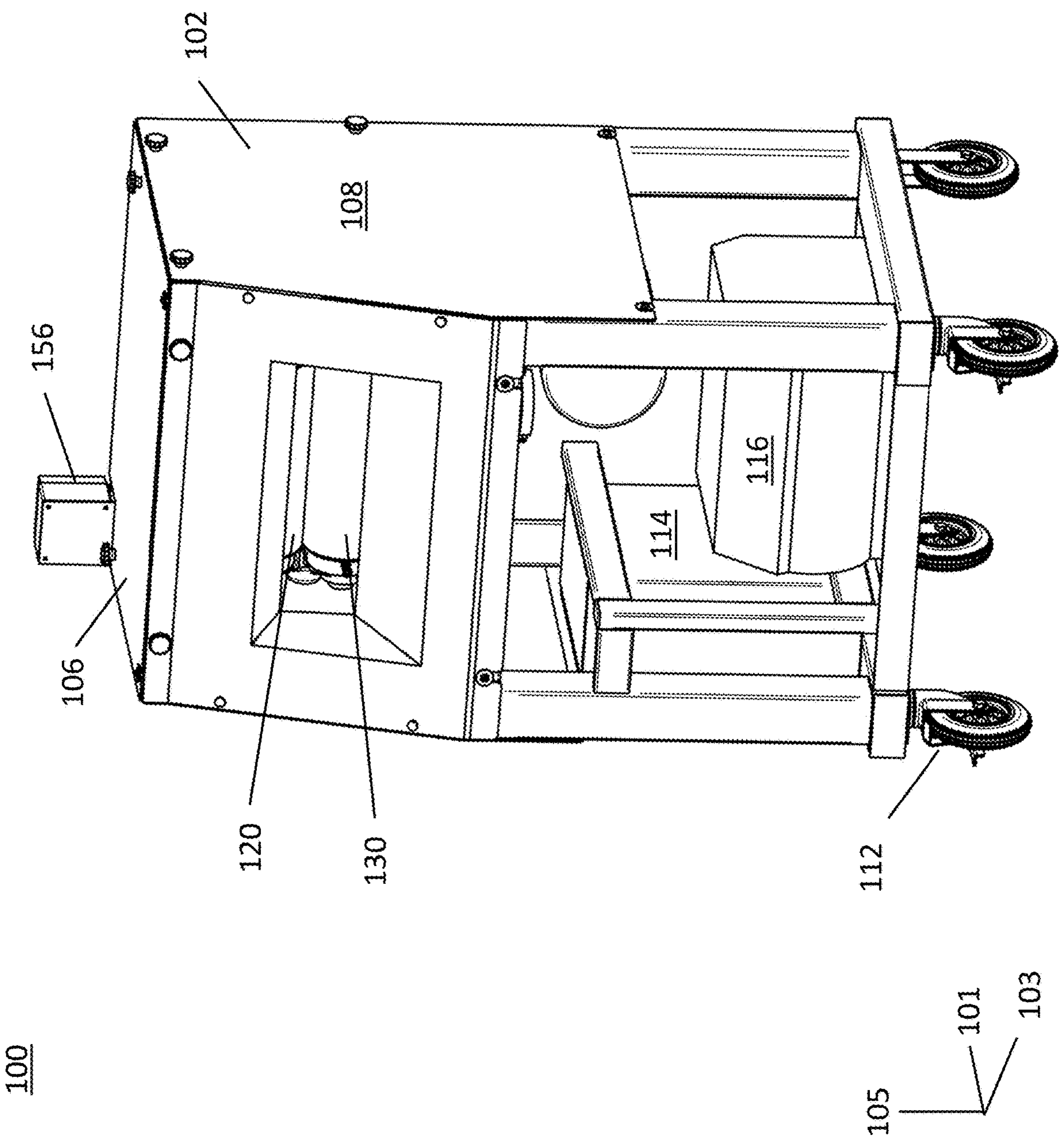
FIG. 2 is a rear side perspective view of the exterior of the bucker of FIG. 1.

FIG. 1 and FIG. 2 are exterior views of a destemming device 100 in accordance with some embodiments of the present disclosure. Referring to both figures together, the device 100 includes a housing 102. The housing 102 includes a cutting aperture 104 through which plant matter to be processed can be fed. The housing 102 further includes a top cover 106 and one or more side covers 108. One or more of these covers may be detachably associated with the housing 102 to permit observation and/or maintenance of the internals. The device 100 may be equipped with wheels 112 to facilitate movement. Below the cutting aperture 104, a retention device 110 may be attached to catch falling plant matter, such as a slide or a conveyor belt for transferring such plant matter to a receptacle/container, or the receptacle/container itself. A conveyor belt is illustrated here.

The side of the housing on which the cutting aperture 104 is located can be considered the front face of the housing. The device can then be considered as having three different axes: a front-to-rear axis 101, a side-to-side or horizontal axis 103, and a vertical axis 105. The front-to-rear axis is referred to herein as indicating depth into the device. The horizontal axis is referred to herein as indicating length. The vertical axis is referred to herein as indicating height.

A control unit 156 may be mounted on the device, optionally on the housing. The device 100 can also be activated and/or controlled using a foot pedal 158. Referring to FIG. 2, the housing also contains a belt system that includes a first (or upper) belt assembly 120 and a second (or lower) belt assembly 130. The belt system is used to grip and pull the plant through the device. Also visible are a cabinet 114 and a compressor 116, which are seen below the belt system.

Figure 3:
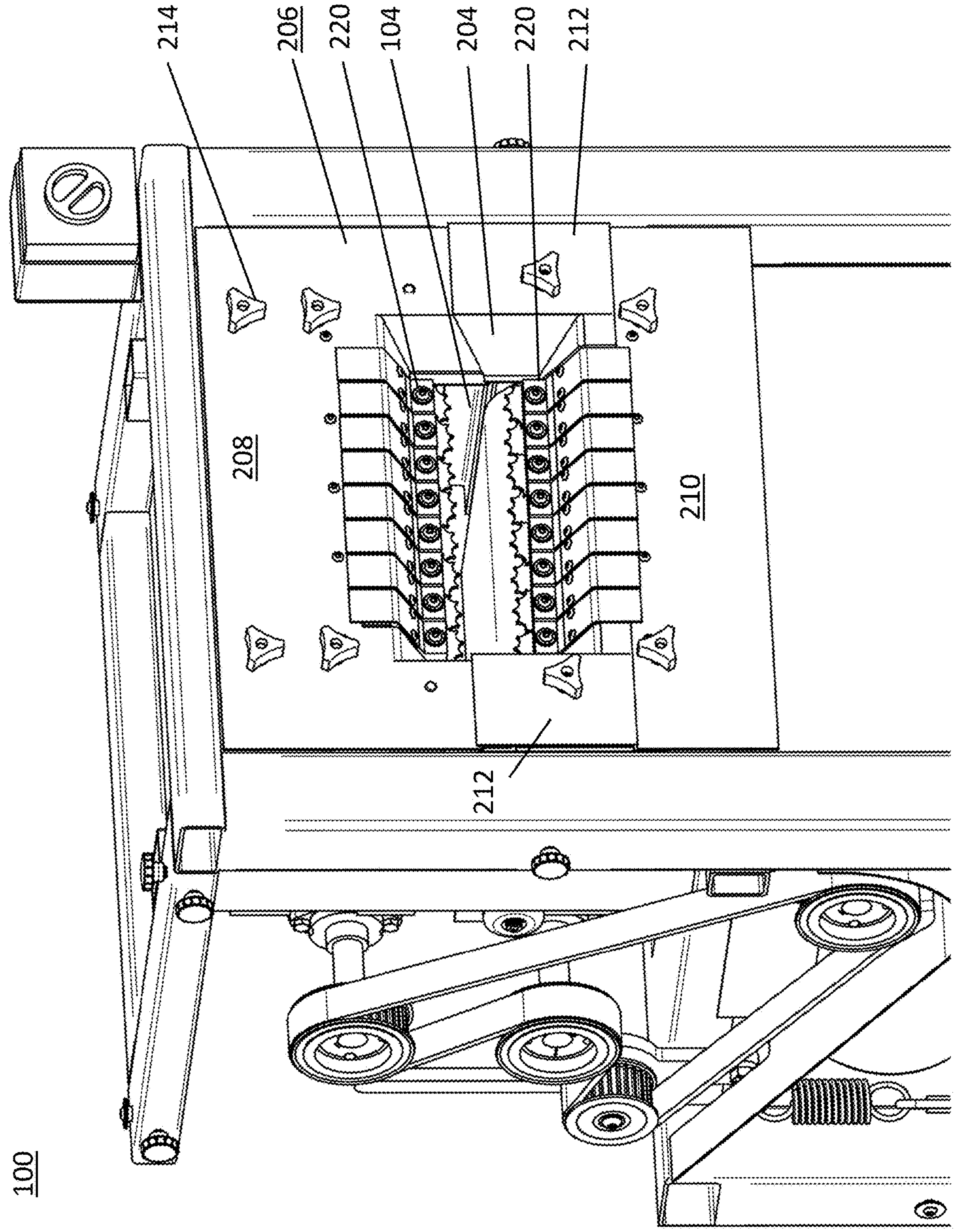
FIG. 3 is a magnified front perspective view of the front face of the destemming device, showing the cutting aperture.

FIG. 3 is a magnified front perspective view of the front face of the destemming device 100, and shows the cutting aperture 104. The front of the destemming device includes a which is part of the housing. The faceplate includes a recess 204 that extends into the housing, which is surrounded by a cover plate 206. Cutting fingers 220 are visible in the recess. Here, the cover plate 206 is made up of an upper cover 208, a lower cover 210, and two side covers 212. The cover plate covers a large opening (not visible) in the faceplate and covers up pinch points in that large opening, increasing user safety. As illustrated here, the cutting fingers are arranged in an upper set and a lower set, and the lower set of cutting fingers is shown in a “down” position that increases the size of the cutting aperture. Eight fasteners/knobs 214 are also visible, which are used to hold the cover plate 206 against the faceplate.

Figure 4:
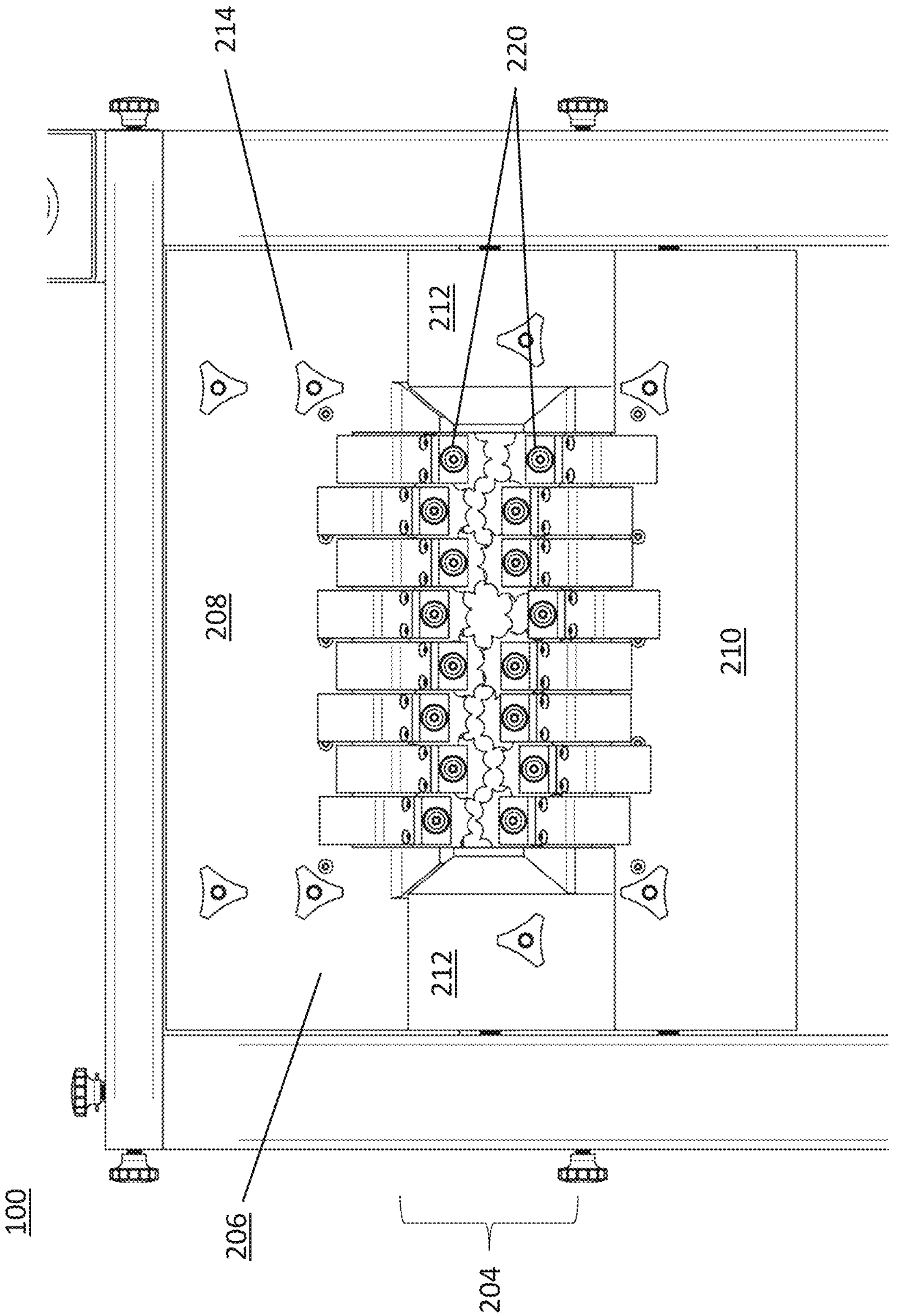
FIG. 4 is a magnified view of the front face of the destemming device, showing the cutting aperture.

FIG. 4 is another magnified view of the front face of the destemming device 100. As illustrated here, a plurality of cutting fingers 220 is visible. As can be seen here, the cutting fingers are arranged in an upper set and a lower set. In each set, the cutting fingers are arranged next to each other in the horizontal axis 103. In addition, each cutting finger can "float" in the vertical axis 105 independently from the other cutting fingers. This floating ability can change the size and shape of the cutting aperture such that the cutting fingers can conform to the shape of the plant stem and any branches, so as to be able to strip plant matter (e.g. leaves and/or buds) from the stem and branches.

Figure 5:
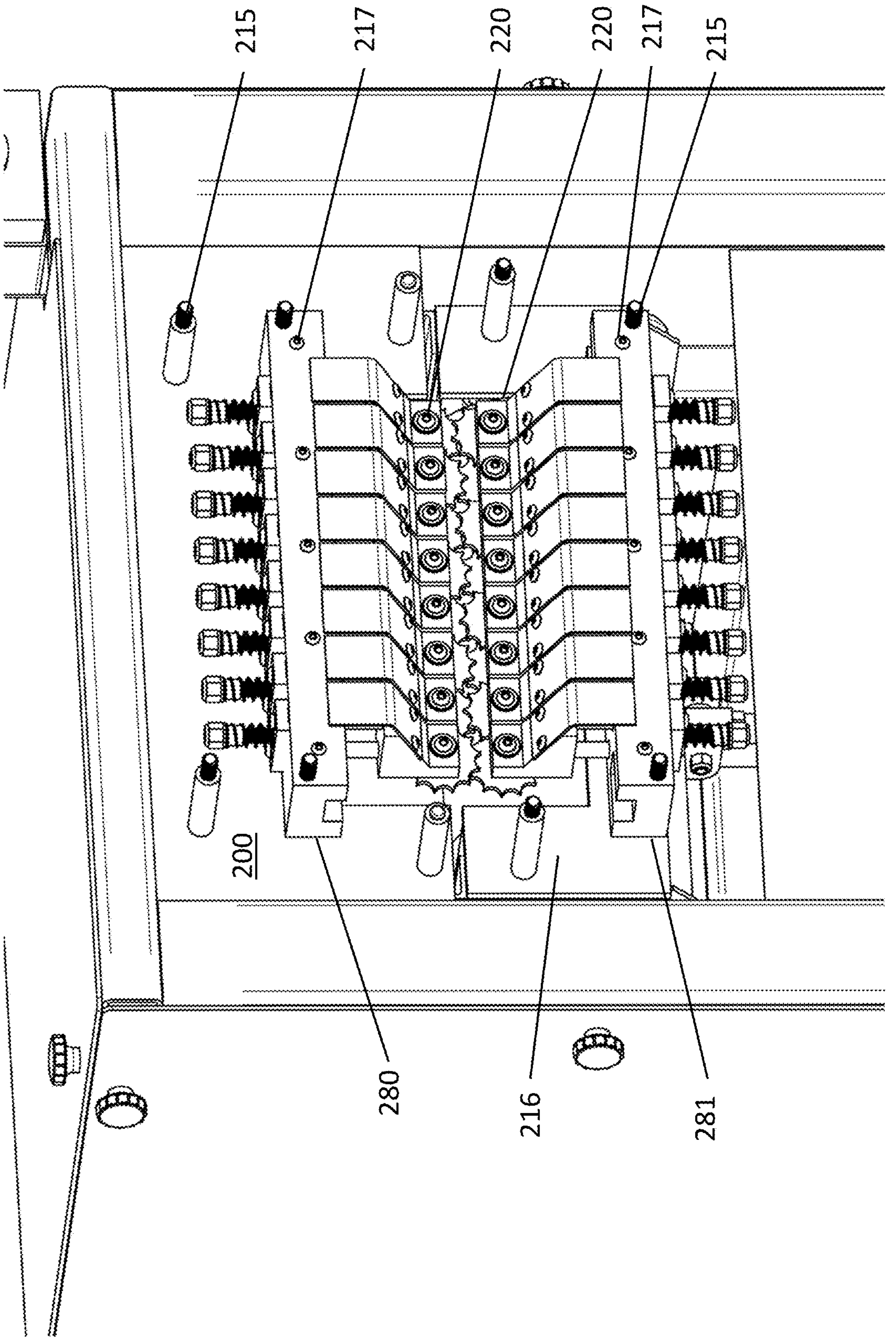
FIG. 5 is a front perspective view of the faceplate with the cover plate removed, permitting a view of some internal components.

FIG. 5 is a front perspective view of the faceplate 200 with the cover plate 206 removed, permitting a view of some internal components of the device. The faceplate 200 may be described as being formed from two pieces, a first or upper backing plate 211 and a second or lower backing plate 216. The first backing plate 211 is attached to the frame of the housing. A first or upper support block 280 is visible along with a second or lower support block 281, with a plurality of cutting fingers 220 being attached to each support block. The first support block 280 is attached to the first backing plate 211 of the faceplate 200, and the second support block 281 is attached to the separate second backing plate 216. Also shown here are several posts 215 which interact with the knobs 214 (see FIG. 3), which are used to both hold the cover plate and also to align the first support block 280 to the faceplate 200. Similarly, two of the posts are also used to align the second support block 281 to the second backing plate 216. Generally, any number of posts/knobs can be used for any of the plates. The two support blocks 280, 281 are also attached to the first backing plate 211 and the second backing plate 216 via additional fasteners 217 such as screws.

Figure 6:
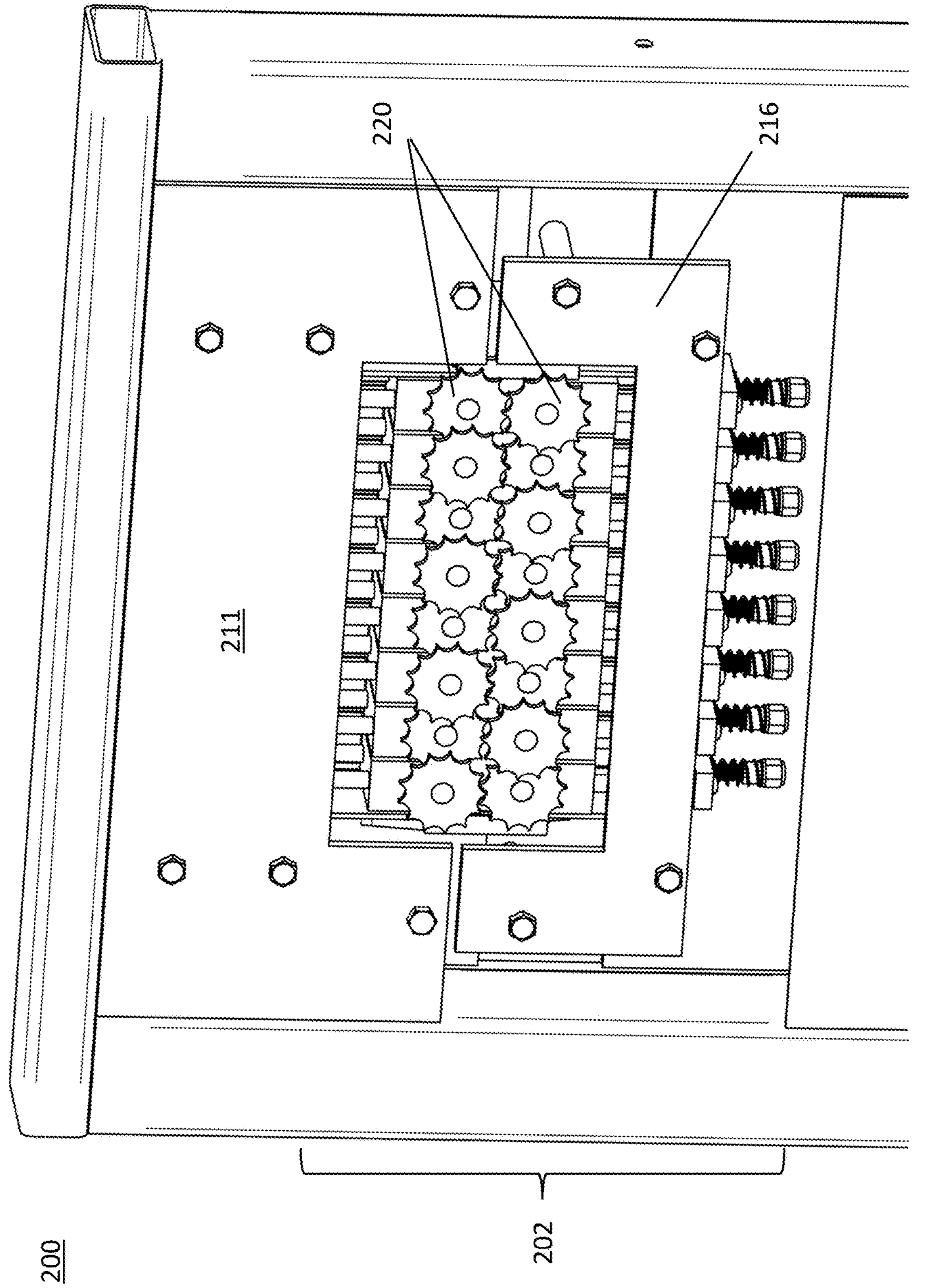
FIG. 6 is a rear perspective view of the faceplate.

FIG. 6 is a rear perspective view of the faceplate 200. The second backing plate 216 attached to the second support block (not visible) is also better seen here. Each backing plate 211, 216 can be described as a U-shaped plate, with a long center and two shorter sides. The opening 202 in the faceplate can be described as a small rectangle stacked upon a larger rectangle. The lower set of cutting fingers 220 and the second backing plate 216 are present within the larger rectangle portion of the opening. The upper set of cutting fingers is present within the smaller rectangle portion of the opening, and the smaller rectangle portion is within the U-shaped portion of the first backing plate 211. The first support block (not visible) is thus fixed in place relative to the housing, while the second support block can move or "float" relative to the housing.

Figure 7:
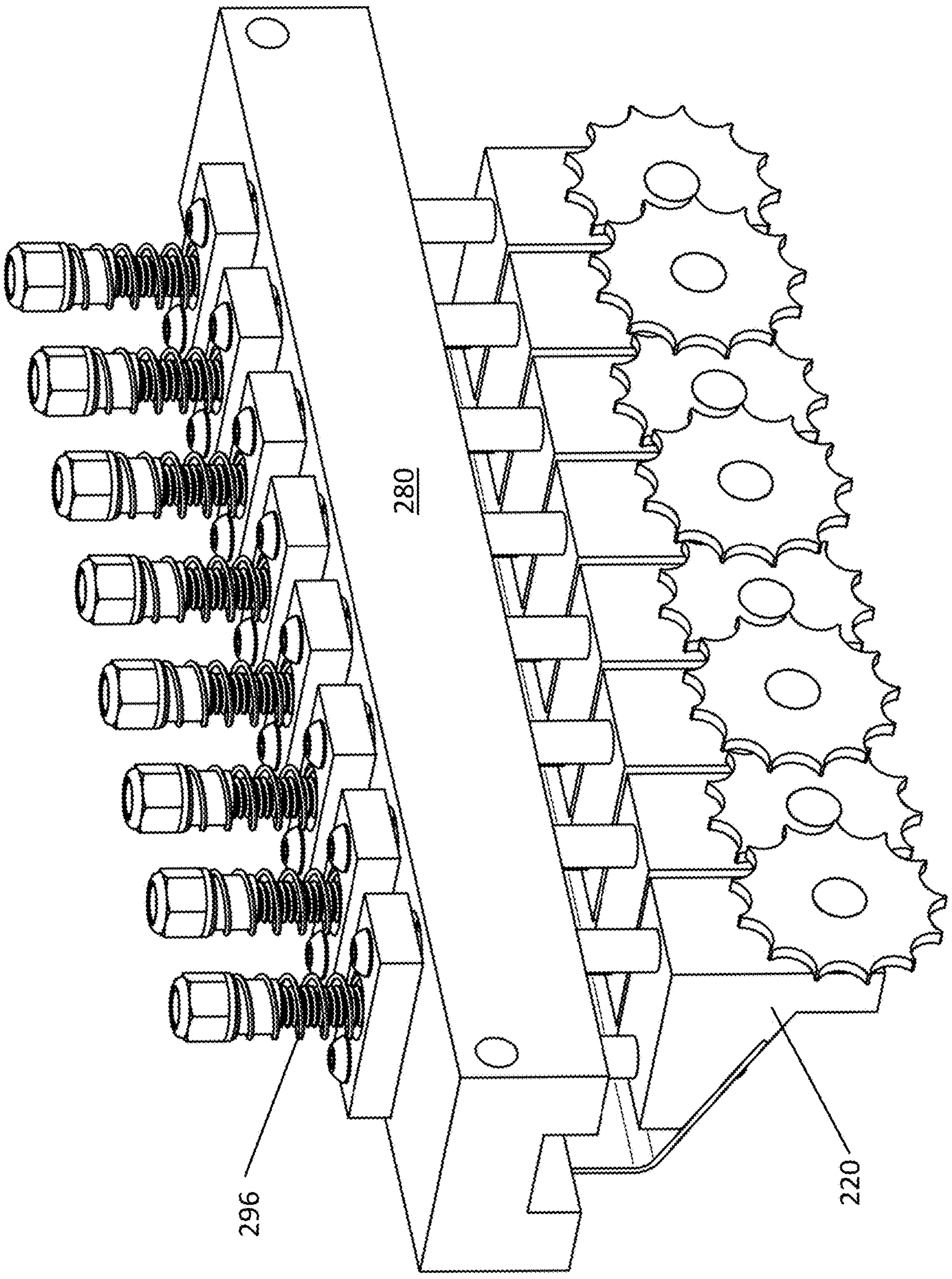
FIG. 7 is a perspective view of a cutter mechanism or assembly formed by the combination of a support block with a plurality of cutting fingers.
Figure 8A:
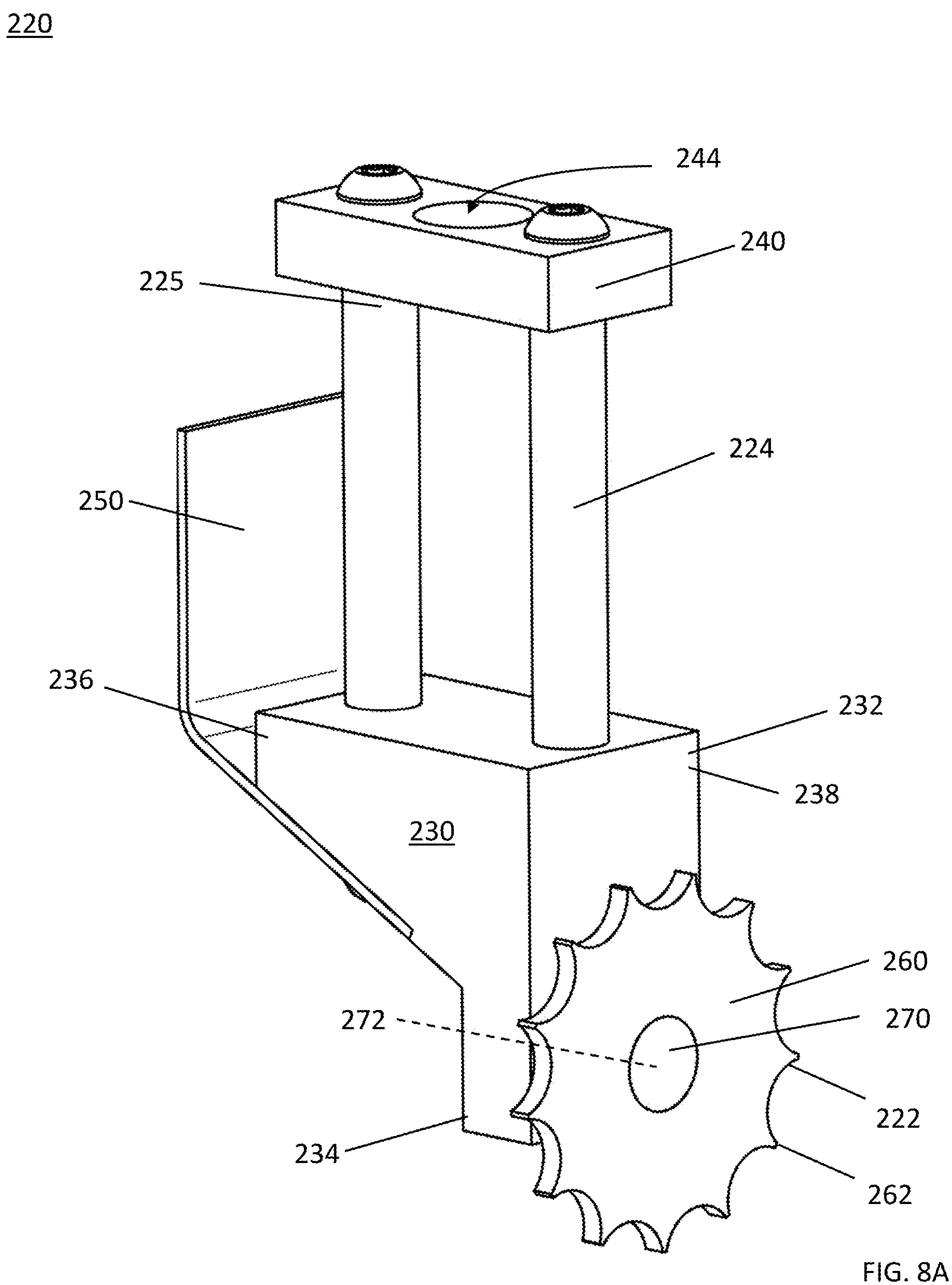
FIGS. 8A-8C are different views of a single cutting finger.
Figure 8C:
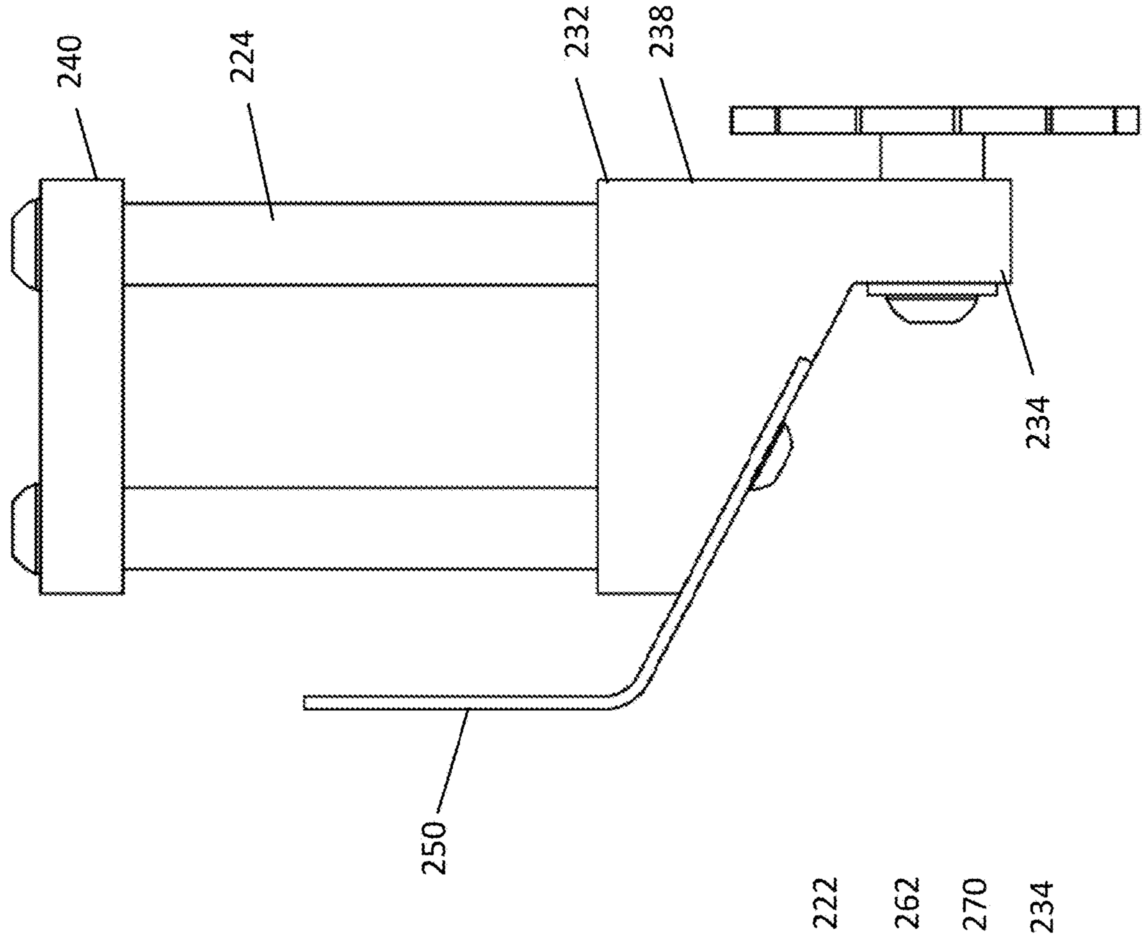
Figure 8B:
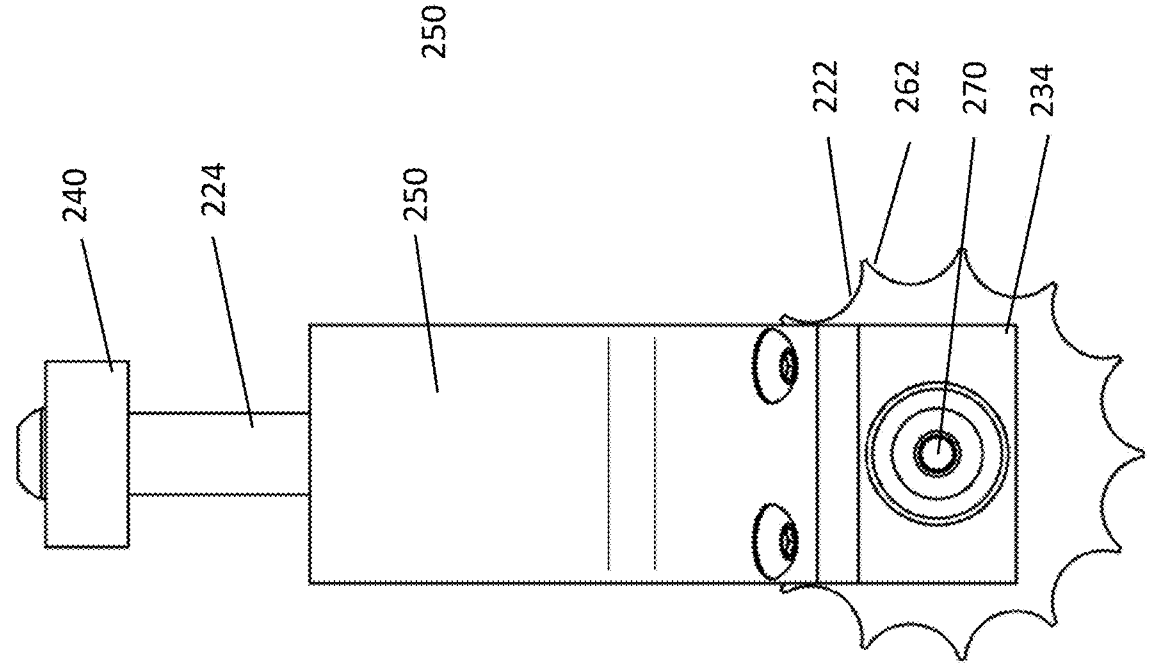
Figure 9:
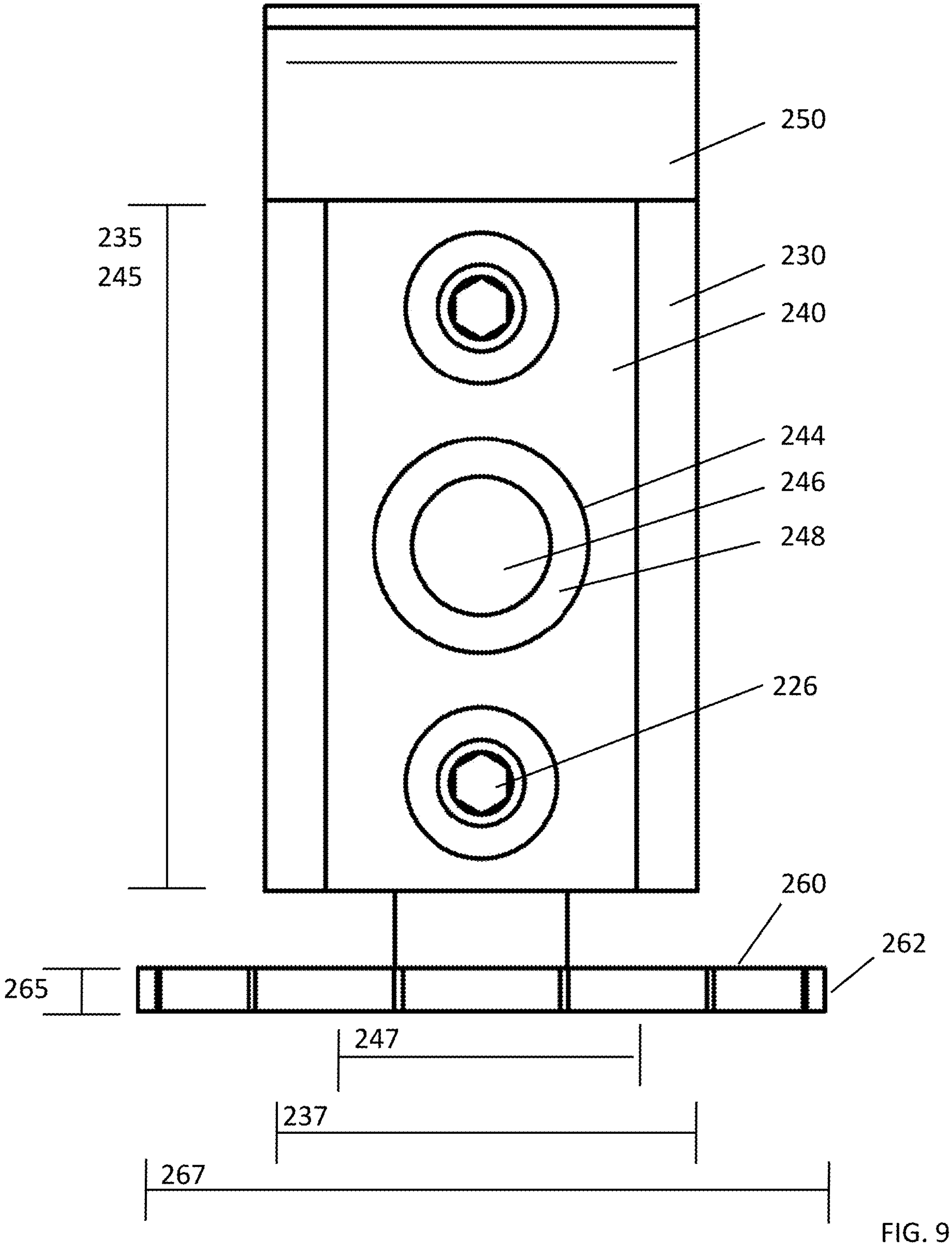
FIG. 9 is a plan view (top or bottom, depending on orientation) of a single cutting finger.
Figure 10:
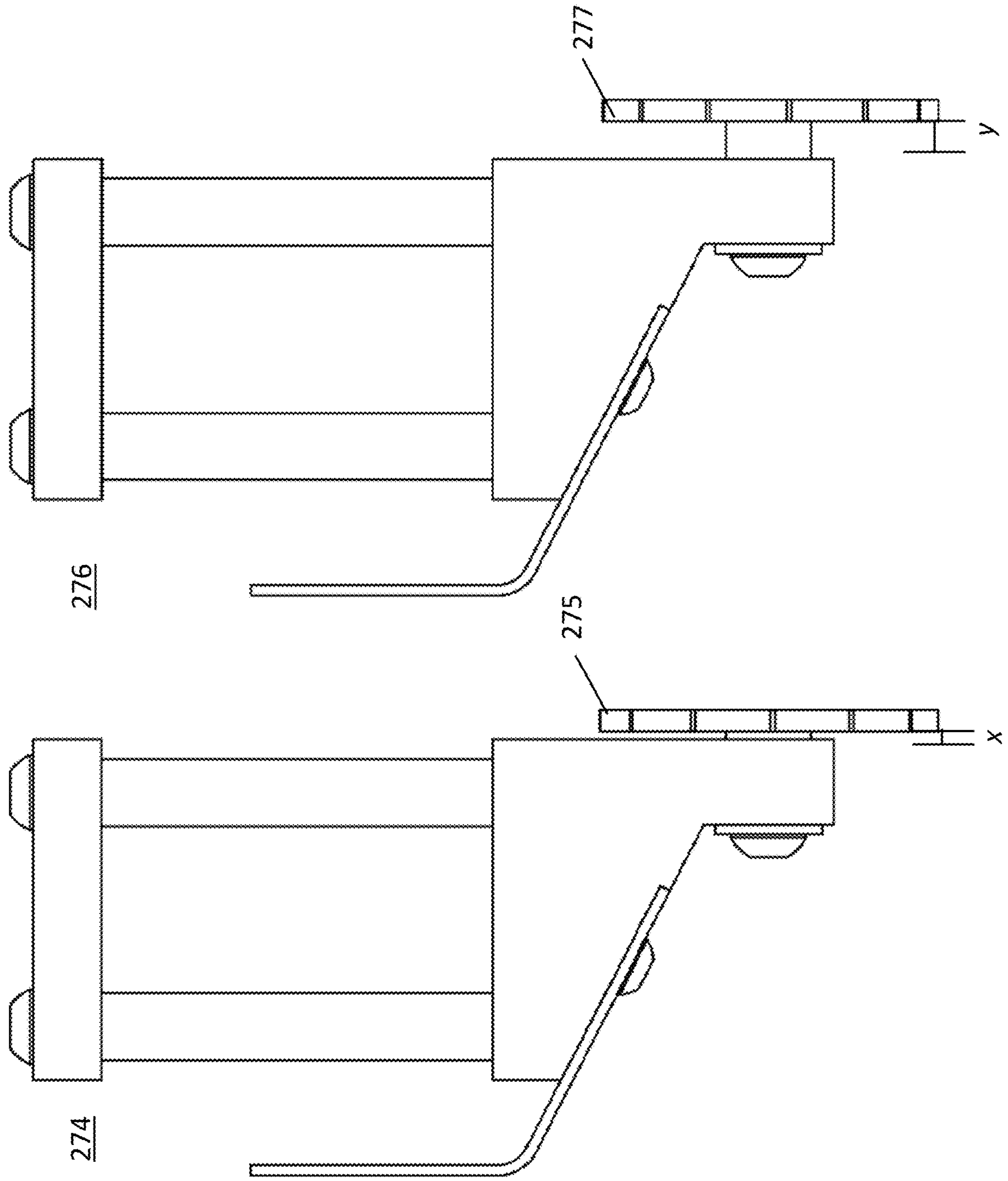
FIG. 10 is a side-by-side comparison of adjacent cutting fingers from the side.

FIG. 7 is a perspective view of a cutter mechanism or assembly 218 formed by the combination of the first support block 280 with a plurality of cutting fingers 220. The combination of the second support block 281 with a plurality of cutting fingers is identical. FIGS. 8A-8C are different views of a single cutting finger 220. FIG. 9 is a plan view of a single cutting finger 220. FIG. 10 is a side-by-side comparison of adjacent cutting fingers 274, 276.

Each support block 280, 281 supports a plurality of cutting fingers 220. FIGS. 8A-8C and FIG. 9 show one particular embodiment of a cutting finger 220. The cutting finger includes a base 230 which supports a cutting edge 222. One or more travel shafts 224 extend from the upper end 232 of the base 230 in an upward direction—two such travel shafts are illustrated here. The travel shafts are shown as having a cylindrical shape, but may have any desired shape.

When multiple travel shafts are present, a cross bar 240 joins them together at their distal ends 225. The cross bar 240 is fixed in place and spaced apart from the base 230. Put another way, the cross-bar and the base do not travel along the length of the travel shafts 224. The cross bar by itself includes a shaft aperture (not visible) for each travel shaft, and also includes a spring mount aperture 244 which will engage the support block.

As illustrated here, the base 230 also includes a front end 236 and a rear end 238. The base is tapered from the lower rear end towards the upper front end, creating the shape of the recess into the housing (see FIG. 1). This tapered shape helps guide plant material into the destemming device more easily. In some embodiments, a guard piece 250 is attached to the tapered face of the base 230, with the guard extending from the base in the same direction as the travel shafts 224, (here, upwards), to cover pinch points and increase operator safety.

In this illustrated embodiment, the cutting edge 222 of the cutting finger is present on a rotating cutting member 260 attached to the lower rear end of the base 230. A cutting member shaft 270 passes through the cutting member 260 and joins the cutting member to the base 320. The cutting member freely rotates around the cutting member shaft 270, on an axis (dotted line 272) that passes through the cutting aperture. In other words, power does not need to be applied to the cutting member to cause rotation to occur. In addition, the cutting member extends beyond the lower end 234 of the base. Put another way, the outer perimeter of the cutting member extends past the base. The cutting edges are also thus recessed relative to the housing.

As illustrated here, the cutting member comprises a plurality of square teeth 262. In other words, the teeth are not angled in the front-to-rear axis. This causes the teeth to essentially scrape material off the stem, without cutting through the stem itself. It is noted that while illustrated as a circular disk with teeth, it is not required for the cutting member to be circular and other shapes such as triangular, square, octagon, etc. may be used.

It is noted that the cutting member does not need to rotate in order to cut. Rather, it is contemplated that when a large plant stem with many branches is fed through, the expanding shape of the plant stem will push outwards as it feeds through the machine. This outward force will cause the cutting fingers to rotate, allowing the plant stem/branches to move to the sides of the cutting member, better distributing the branches. The up-and-down motion of the cutting fingers also complements this motion so they can roll more easily and prevent binding of the plant branches within the cutting fingers.

Referring now to FIG. 9, some additional aspects are visible. Initially, the depth 245 of the cross bar 240 and the depth 235 of the base 230 are generally about the same. However, the length 237 of the base is greater than the length 247 of the cross bar. Also visible here is the spring mount aperture 244 in the cross bar 240, which will engage the support block. The spring mount aperture 244 includes both an opening 246 and a lip 248. The fasteners 225 for the travel shafts are also illustrated.

Continuing, the length 267 of the cutting member 260 is greater than the length 237 of the base. The cutting member 260 has a constant thickness 265. The square shape of the teeth 262 is also visible here, as evidenced by the right angle on the front and rear sides of the tooth.

Referring now to FIG. 7 and FIG. 10, together, it can be seen that on adjacent cutting fingers 274, 276 on the same support block, the cutting members 275, 277 are offset from each other in the front-to-rear axis, and the cutting members also overlap in the horizontal axis. As noted in FIG. 10, one cutting finger 274 has a cutting member shaft gap x, and the adjacent cutting finger 276 has a cutting member shaft gap y, with x<y. The overlapping of the cutting members prevents plant stems/branches from avoiding the cutting action and also reduces jams by eliminating gaps that might otherwise arise. Referring back to FIG. 6, it can also be seen that cutting fingers 220 on the two support blocks also overlap in the vertical axis with each other. Referring back to FIG. 4, the combination of multiple cutting fingers from both the upper set and the lower set creates multiple holes or dies, which can vary in size, to fit the contours of the plant stem/branch and scrape off the leaves and/or buds.

This design using cutting teeth allows the stem/branches to always land on a cutting edge. If the branch moves all the way to one side of the cutting aperture, the faceplate will also act as a cutting edge to remove leaves/buds. This allows the cutting aperture to adapt to the shape of the plant as it passes through the destemming device.

Figure 11A:
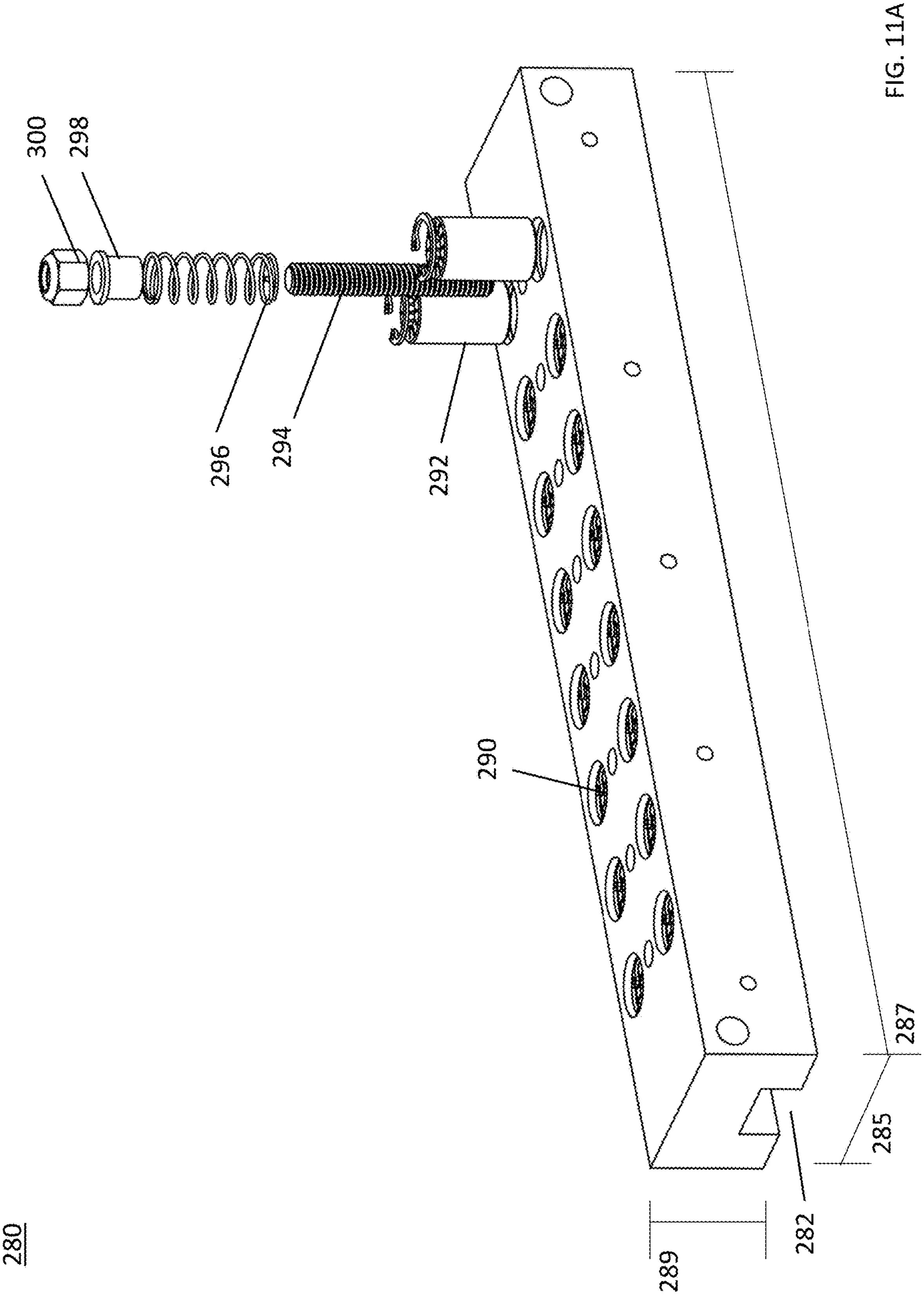
FIG. 11A is a perspective exploded view of a support block for the cutting fingers.
Figure 11B:
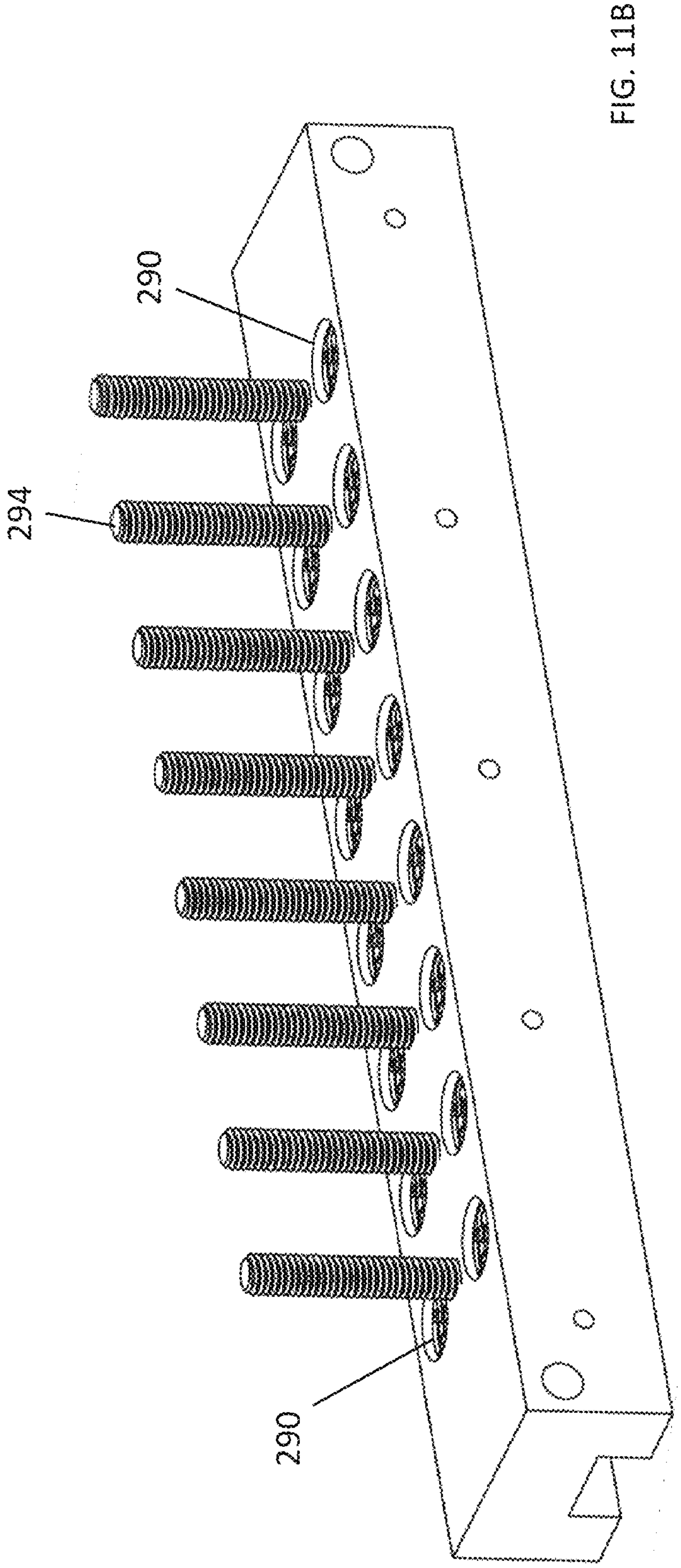
FIG. 11B is a perspective view of the support block, excluding some components.
Figure 12:
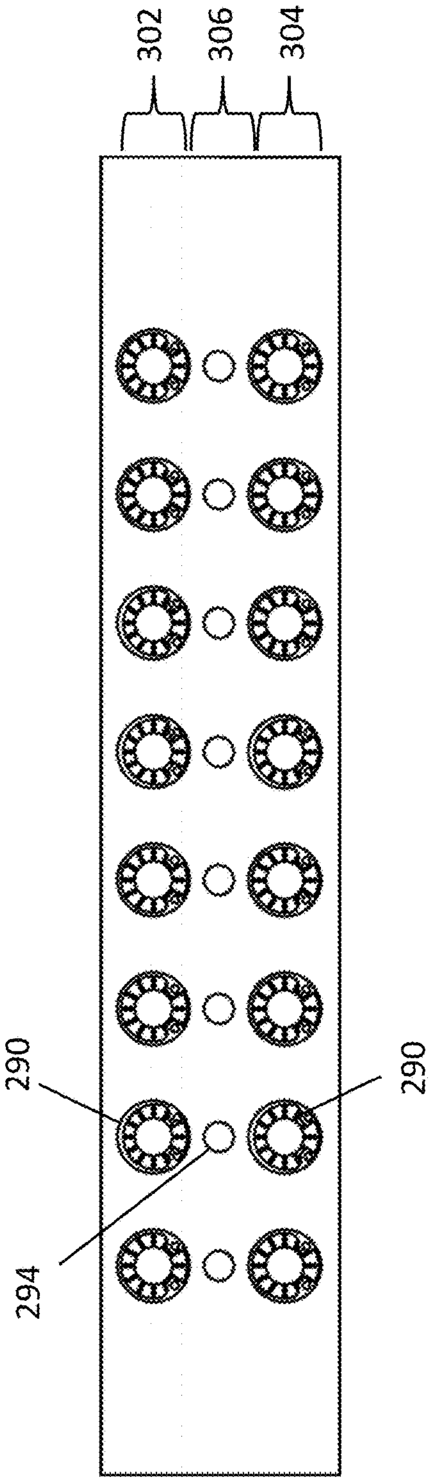
FIG. 12 is a top view of the support block, excluding some components.
Figure 13:
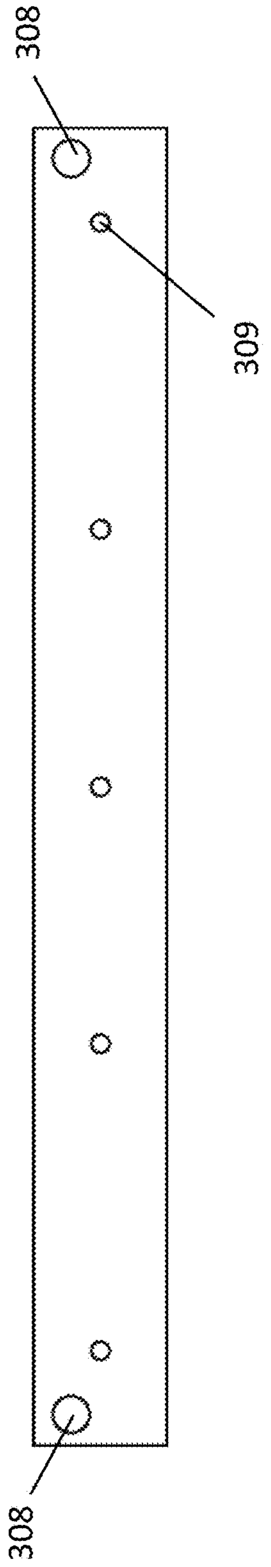
FIG. 13 is a front view of the support block, excluding some components.

FIGS. 11-13 are different views of a support block 280 by itself, without the cutting fingers attached thereto. FIG. 11A is a perspective exploded view, FIG. 11B is a perspective view excluding some components, FIG. 12 is a top view that excludes some other components, and FIG. 13 is a front view that also excludes some other components.

The support block 280 is a solid piece. The support block is generally rectangular, but may vary in shape as will be discussed later. The support block has a depth 285, a length 287, and a height 289. A cutout 282 is present on each side of the lower side of the support block, which is done to reduce weight and also provides an attachment point for the cover plate 206, which can add significant rigidity to the overall assembly.

As best seen in FIG. 11 and FIG. 12, and also referring to FIG. 8A, for each given cutting finger that will be attached, the support block includes one or more rail apertures 290 through which the travel shaft(s) 224 of the cutting finger will pass. A low-friction material 292 is located within each rail aperture, to permit the travel shaft to slide more freely within the rail aperture. The support block also includes a spring mount 294 located between the rail apertures 290. The spring mount will pass through the spring mount aperture 244 of the cross bar 240. The spring mount 294 also passes through the coil of a compression spring 296. The compression spring is long without an applied load, and gets shorter as load is applied. Put another way, the compression spring is biased to be long. Continuing, an optional spring collar 298 is then placed upon the compression spring 296 to act as a resting surface. A spring cap 300 is then joined to the distal end of the spring mount 294. The compression spring 296 is thus biased between the support block 280 and the spring cap 300 against the horizontal face of the support block.

As illustrated here, the spring mount 294 is in the form of a shaft with an external thread, and the spring cap 300 is in the form of a nut that screws onto the spring mount 294. This configuration allows for various forces to be changed by tightening the nut. The compression springs can also be changed out to change the force applied. Other spring mount and spring cap forms are also contemplated, including those where the spring mount and the spring cap are a single combined component, such as a bolt that is screwed into the support block. FIG. 11B shows the support block with a first plurality of rail apertures 290, a second plurality of rail apertures, and a plurality of spring mounts 294 running across the length of the support block 280. The compression spring, spring collar, and spring cap are "loose" items that are attached upon the support block when the cutting fingers are also attached thereto.

Looking at the top view of FIG. 12 as a whole, the first plurality 302 of rail apertures and the second plurality 304 of rail apertures runs across the length of the support block 280 on opposite side of the support block. The plurality 306 of spring mounts also runs across the length of the support block 280, between the two pluralities 302, 304 of rail apertures.

Referring now to FIG. 13, this figure does not include the spring mounts. Two apertures 308 are visible, one at each end of the front side. Five additional smaller apertures 309 are also visible in a line across the length of the front side. Referring back to FIG. 5, the two larger apertures 308 are used to mount the support block to the posts 215 on the first backing plate 211 or the second backing plate 216 as appropriate. The five smaller apertures 309 are used for fastening the support block to the faceplate or the backing plate, for example via screws 217.

Referring back to FIG. 7, then, it can be seen that the base 230 of a given cutting finger and the cross bar 240 of the given cutting finger are on opposite sides of the support block 280. When a cutting finger is mounted onto the support block, the compression spring 296 is then biased against the cross bar 240. Each cutting finger is thus spring-mounted and able to travel relative to the support block. As a result, each cutting finger can move up-and-down in the height axis, or "float". As previously discussed, this permits the cutting aperture to have different shapes and sizes to conform the cutting edges to the plant stem and branches. In addition, as the plant stem and branches move into the cutting aperture, they will sometimes push upwards and sometimes push downwards. The floating ability of the cutting fingers aids in conforming to the stem/branches during their entire trip through the destemming device. A stripping force is thus applied to all leaves/buds while the stem/branches flow freely through open spaces in the cutting aperture.

In addition, the compression spring 296 is on the far side of the support block 280 from the cutting finger 220. Put another way, the support block 280 is located between the cutting finger 220 and the compression spring 296. This placement moves the compression spring away from exposure to plant material which could potentially clog the spring.

Figure 14:
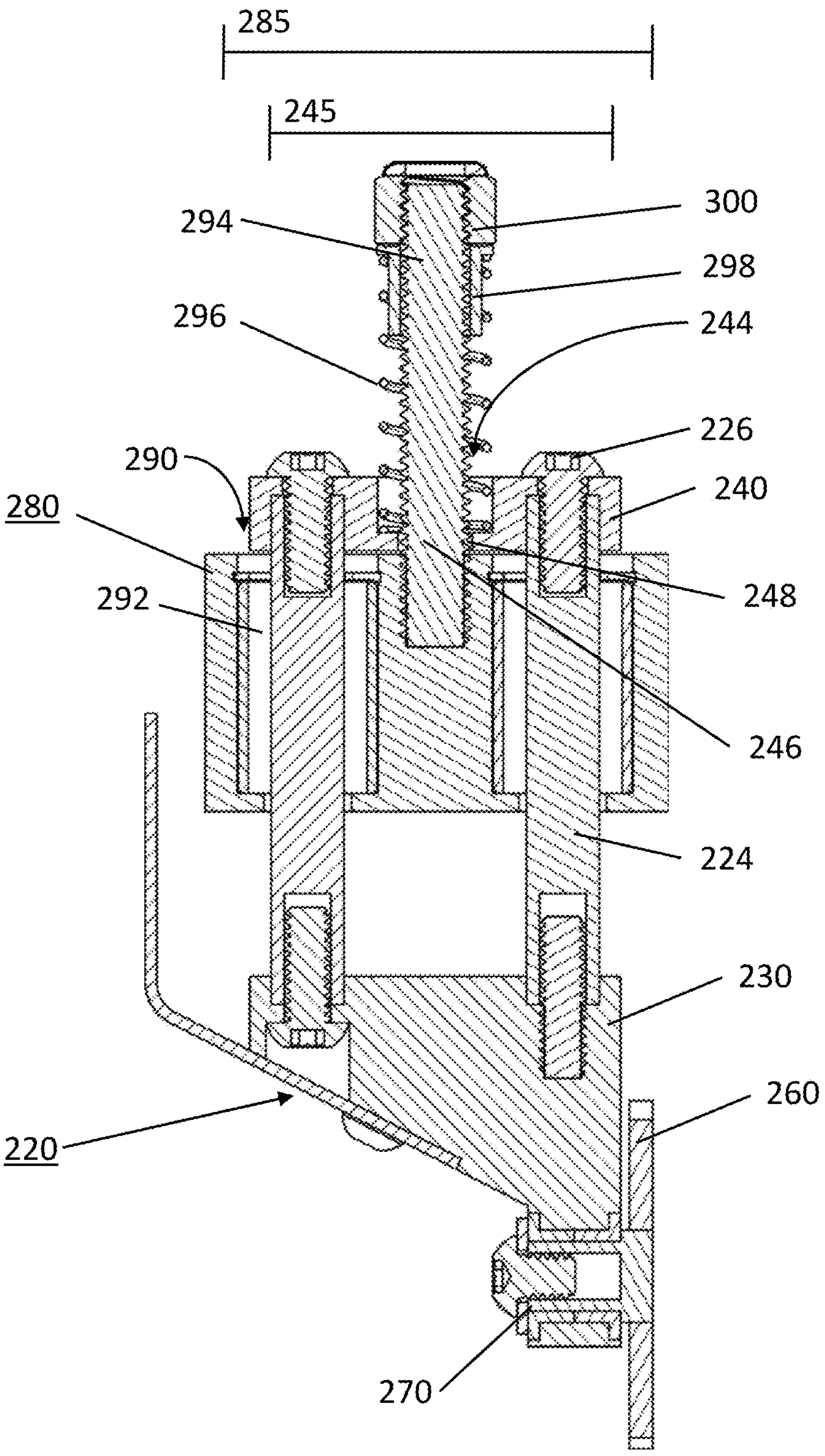
FIG. 14 is a side cross-sectional view of the cutter assembly.

FIG. 14 is a cross-sectional view of the support block 280 and a cutting finger 220, showing additional aspects of these components. The spring mount aperture 244 in the cross bar 240 includes an opening 246 that passes entirely through the cross bar 240. A lip 248 surrounds the opening, and the compression spring 296 rests upon the lip of the cross bar. The depth 245 of the cross bar 240 is less than the depth 285 of the support block 280. A low-friction material 292 is placed within each rail aperture 290. The travel shafts 224 are attached to the base 230 and the cross bar 240 via fasteners 226 such as screws. At the distal end of the spring mount 294 are the optional spring collar 298 and the spring cap 300. Also visible is the cutting member 260 and the cutting member shaft 270.

Figure 15:
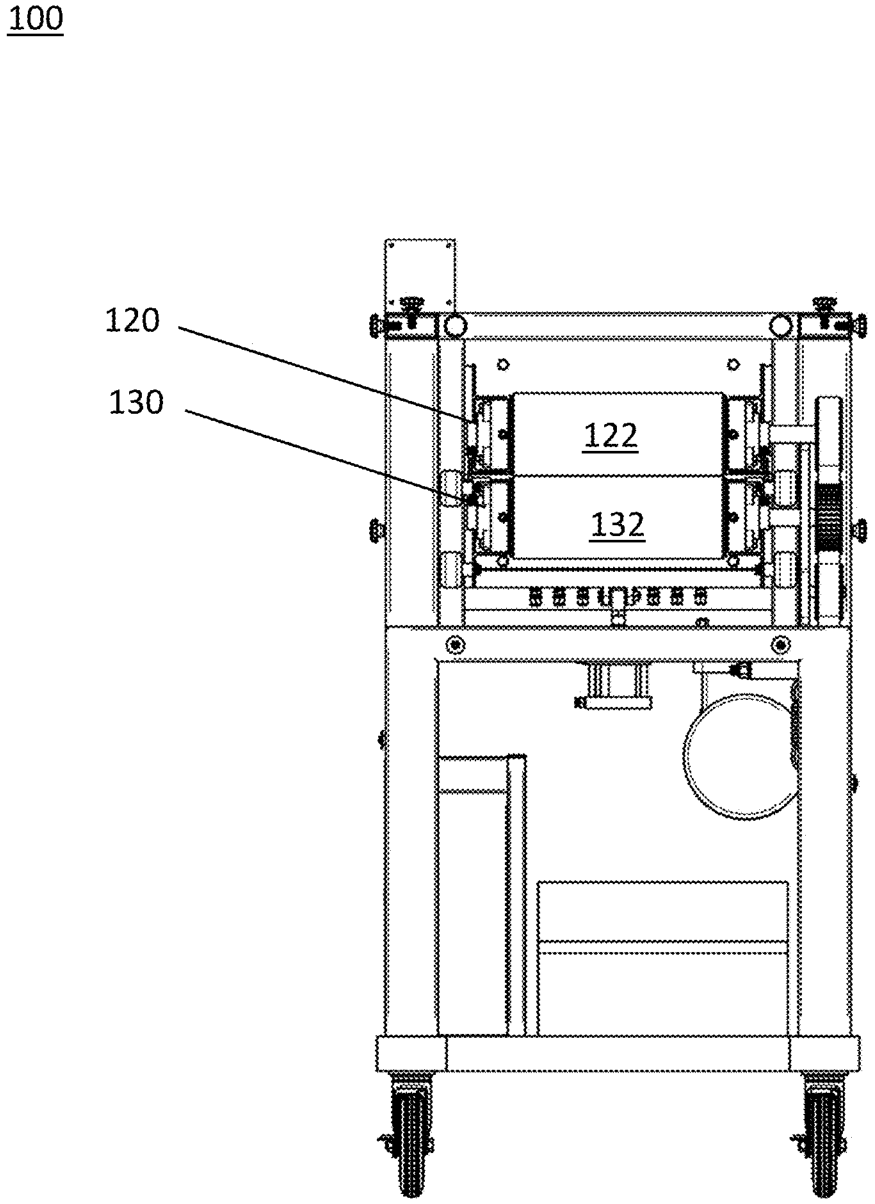
FIG. 15 is a rear view of the destemming device with the covers removed so the belt system is visible.
Figure 16:
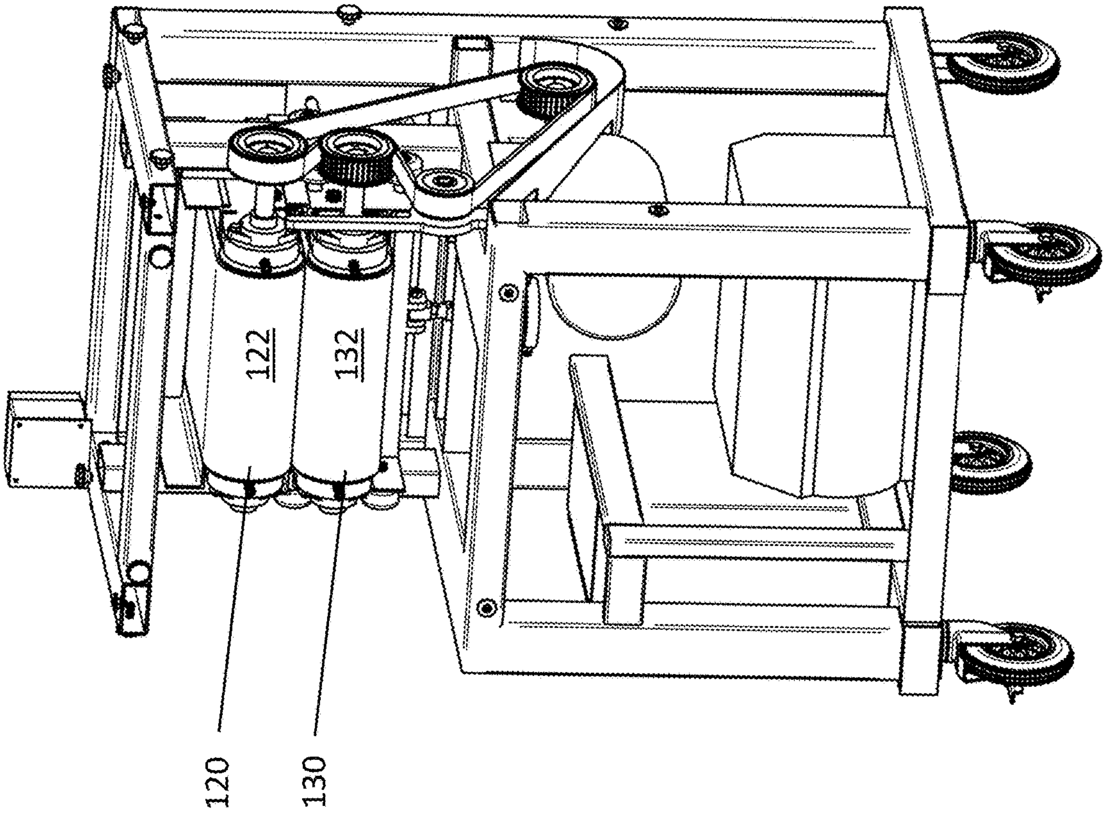
FIG. 16 is a side perspective view of the destemming device with the covers removed so the belt system is visible.

Continuing, then, the faceplate and aperture with cutting fingers trims leaves and/or buds from a plant stem which is pulled into the destemming device by a belt system. FIG. 15 and FIG. 16 provide some interior views of the device.

FIG. 15 is a rear view, and FIG. 16 is a side perspective view of the device 100 with the covers of the housing removed. The housing contains a belt system that includes a first (or upper) belt assembly 120 and a second (or lower) belt assembly 130. The first belt assembly 120 includes a first gripper belt 122, and the second belt assembly 130 includes a second gripper belt 132. The first belt assembly 120 is located above the second belt assembly 130 in this illustration.

Figure 17:
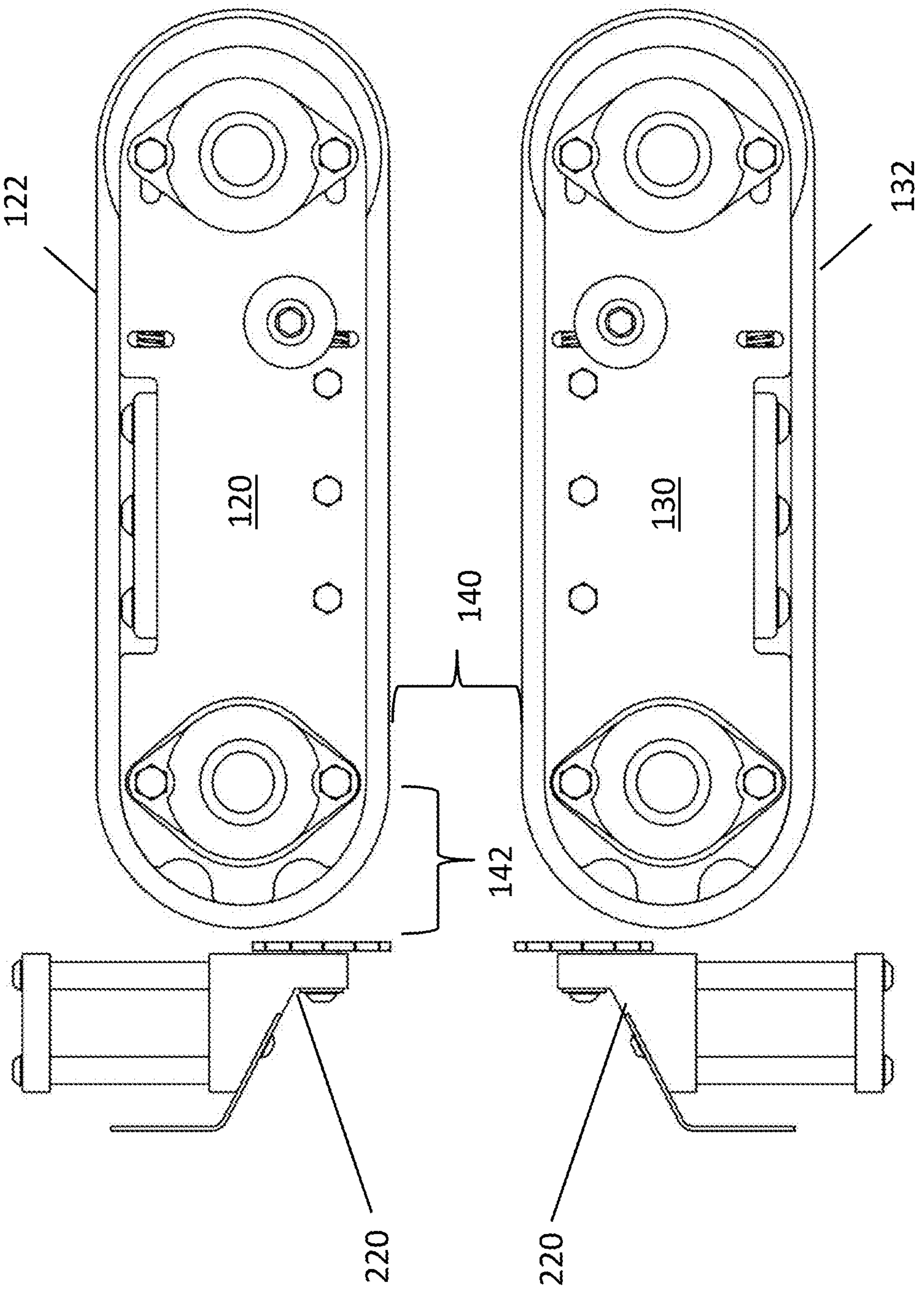
FIG. 17 is a side cross-sectional view showing the faceplate, the cutting fingers, and the two belt assemblies.

FIG. 17 is a side cross-sectional illustration showing the interrelationship between the faceplate with the cutting fingers 220 and the two belt assemblies 120, 130. Together, the first belt 122 and the second belt 132 define a nip 140 at a forward location within the housing adjacent to the cutting aperture 104. As used herein, the term "nip" encompasses contact between the belt assembles and/or a small gap therebetween. The cutting aperture is aligned with the nip. The distance between the cutting fingers 220 and the two belts 122, 132 is indicated with reference numeral 142. It may be desirable to minimize the distance 142, which represents the length of the plant stem that needs to be fed manually into the destemming device before the plant can be mechanically pulled into the destemming device by the belt system.

Figure 18:
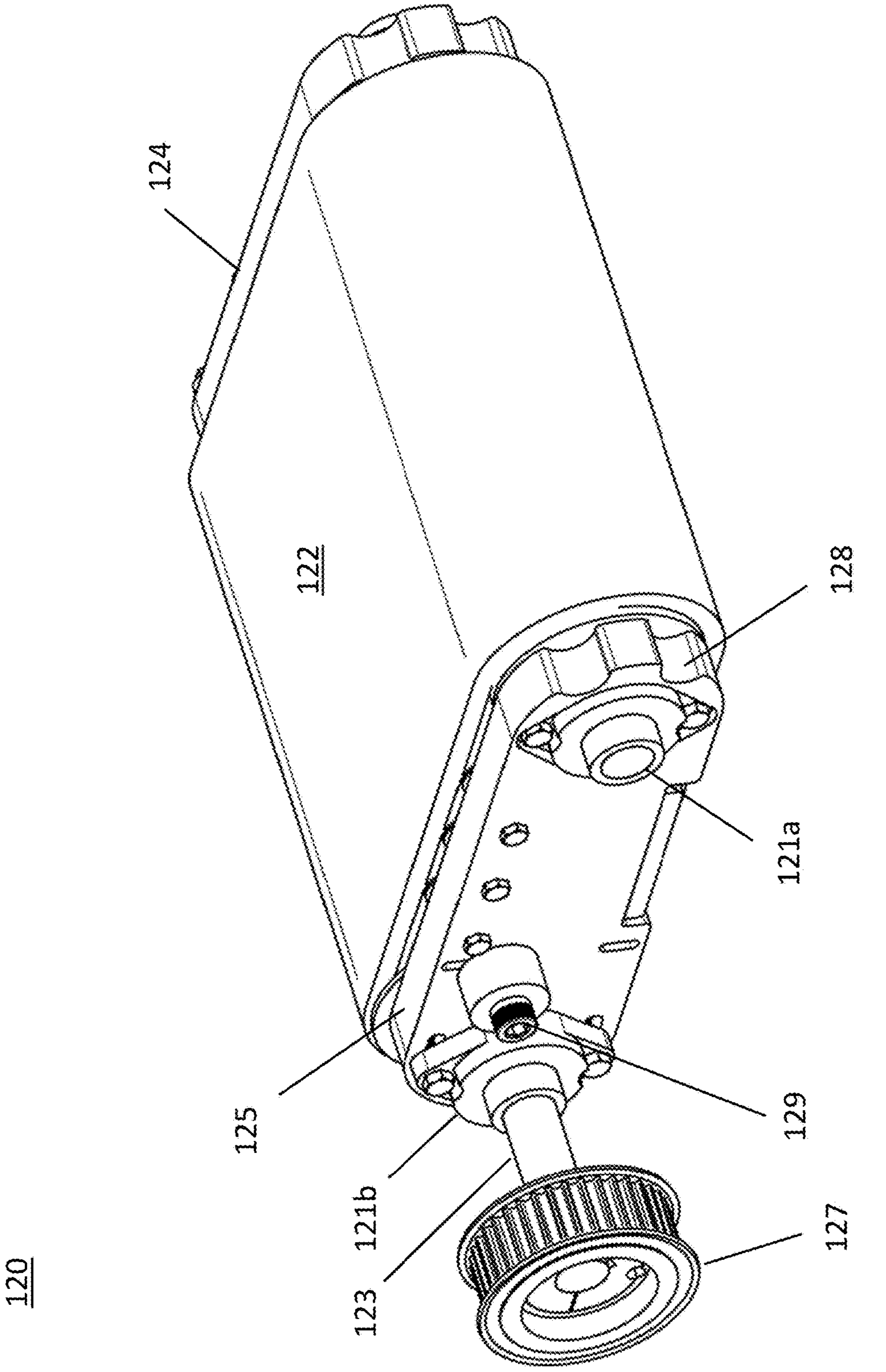
FIG. 18 is a perspective view of one embodiment of a belt assembly used in the device.
Figure 19:
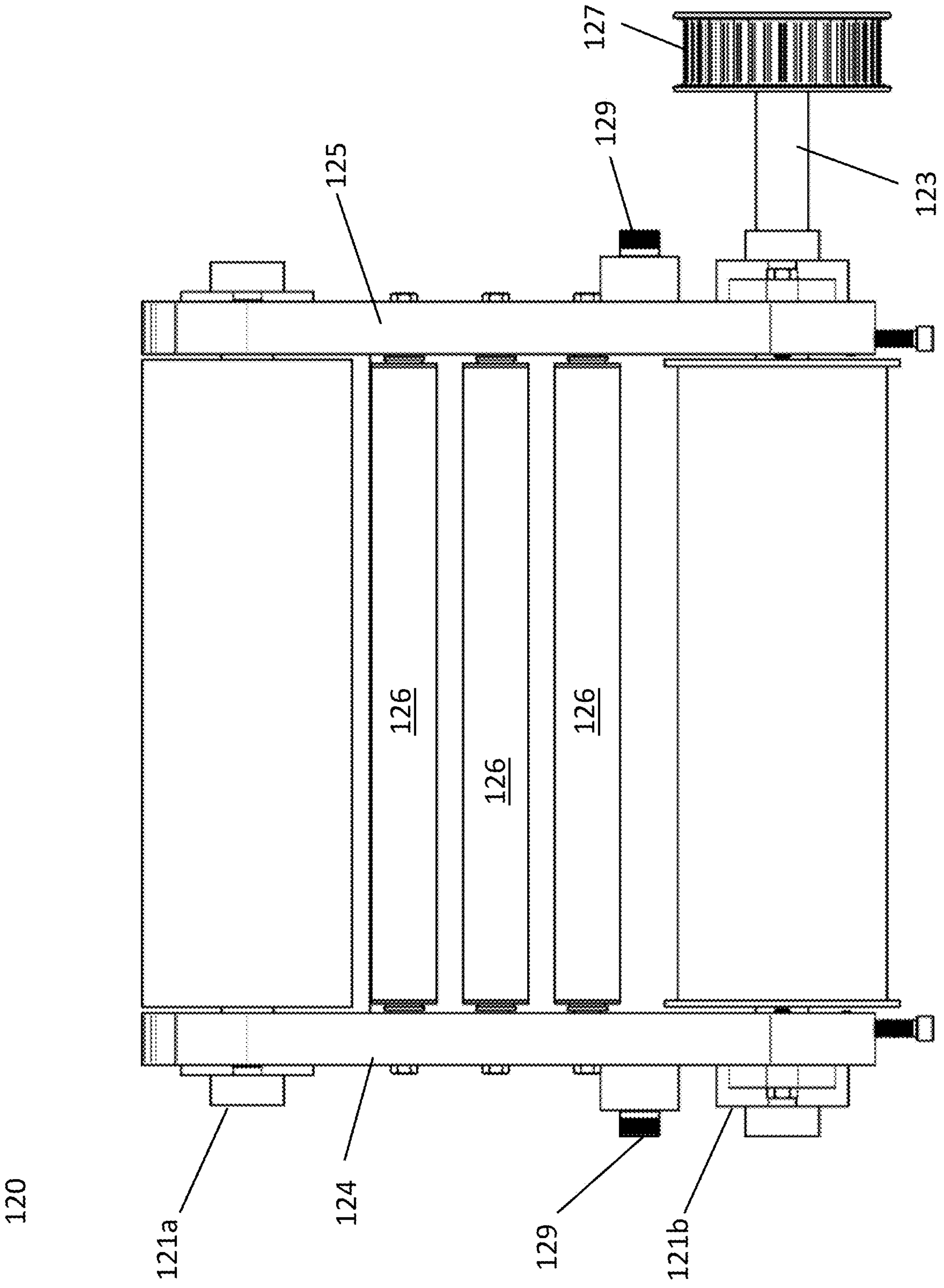
FIG. 19 is a top view of the belt assembly, with the gripper belt removed to show the internal structure.

Continuing, FIG. 18 is a perspective view of one embodiment of a first belt assembly 120 separated from the housing. FIG. 19 is a top view of the first belt assembly, with the first gripper belt (122) removed to show the internal structure of the first belt assembly. The second belt assembly 130 has the same structure, and the following discussion applies to both belt assemblies. The first belt assembly 120 includes first rollers 121 (including front roller 121*a* and rear roller 121*b*), a first gripper belt 122, a first rail 124, a second rail 125, one or more first support bars 126, and a first driven pulley 127. The first rail 124 and the second rail 125 define opposite spaced-apart sides of the first belt assembly. The first support bars 126 extend between the first rail 124 and the second rail 125, creating a frame on which the rollers can rotate, and can themselves function as rollers too. The first rollers 121 and the first gripper belt 122 are located between the first rail 124 and the second rail 125, with the first gripper belt 122 traveling around the first rollers 121. A plurality of first rollers may be present. Each first roller 121 rotates around a shaft, which can extend beyond the rails, and may be complementary to one or more other elements within the housing which receive the one or more shaft to support the first belt assembly. The first driven pulley 127 is connected to a shaft 123 that extends outwards beyond one of the rails 124, 125 and is attached to one of the first rollers 121. A locking hole 129 is present on each rail 124, 125. In addition, the front end of each rail 124, 125 includes notches 128 for alignment and positioning of the belt assembly. The notches are optional, but helpful.

There are also two bolts in the rear of the belt assembly, which can be used for changing the belt. To replace the belt, the screws on the roller are loosened. The two bolts are then tightened to push the roller forward against a spring force. This releases belt tension. The belt can then be removed from the assembly and replaced. The two bolts are then loosened, and springs then push the roller back to tension the belt. The screws on the roller are then tightened. This eliminates the need for the user to manually tension the belt.

Figure 20:
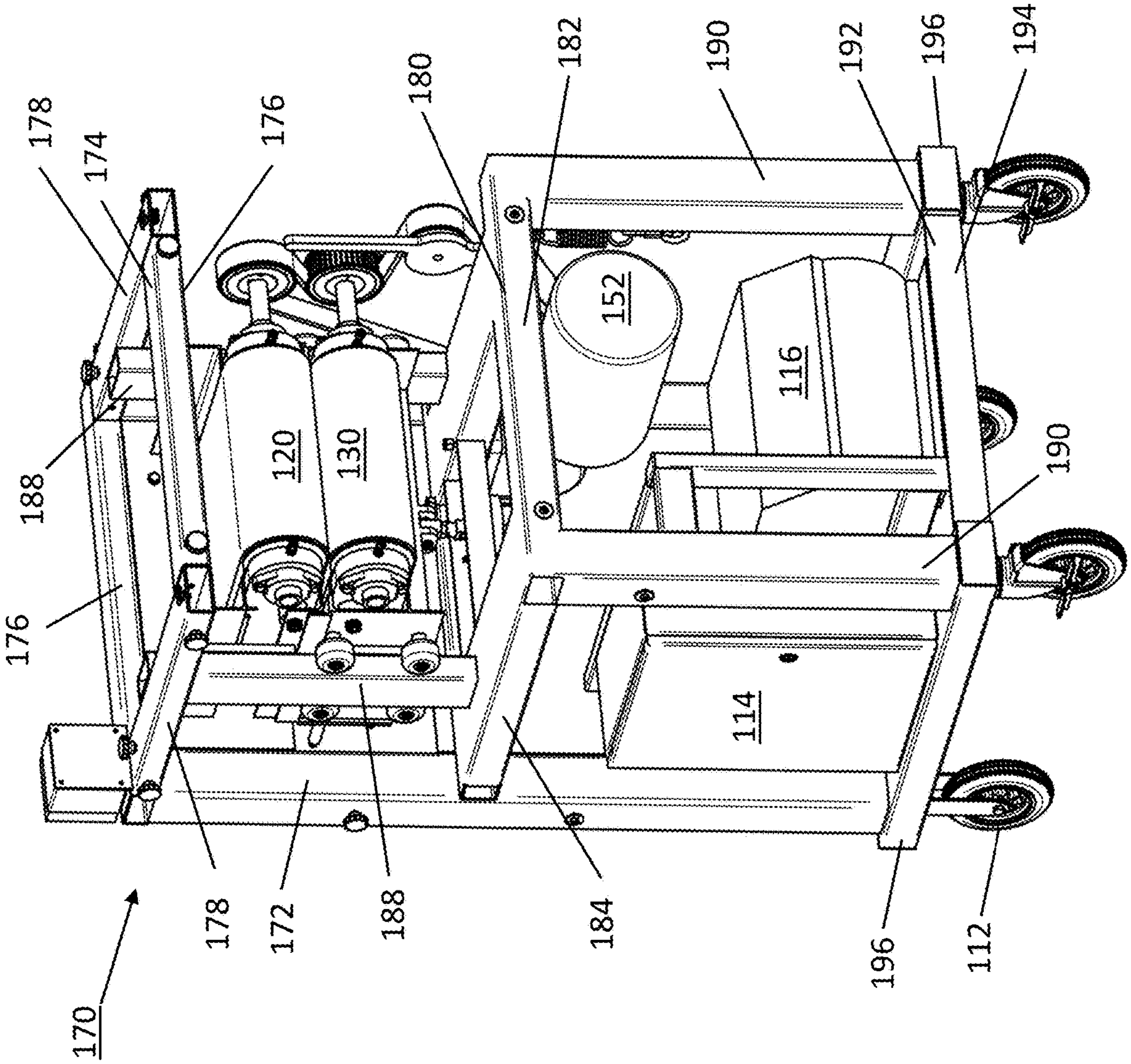
FIG. 20 is a rear perspective view showing the device frame which supports the various components of the device, and also shows the belt assemblies in a first position.

FIG. 20 illustrates the device frame 170 upon which all internal components and the housing are attached. The device frame is made up of two front corner posts or legs 172 which extend vertically from the bottom of the device to the top of the device at the front of the device. The faceplate is attached to the two front corner posts. An upper horizontal frame 174 is located at the top of the front corner posts, and is formed from two joists 176 extending the length of the device and two joists 178 extending the depth of the device. A central horizontal frame 180 is located below the upper horizontal frame 174. The central horizontal frame is also formed from two joists 182 extending the length of the device and two joists 184 extending the depth of the device. In addition, a fixed crossbar (not visible) extends across the middle of the central horizontal frame, along the length of the device. Two track pieces 188 are also present, one on each side of the device frame. These track pieces extend vertically between the upper horizontal frame 174 and the central horizontal frame 180. Finally, two lower rear corner posts or legs 190 extend downwards at the rear of the device from the central horizontal frame 180 down to the bottom of the device. A lower horizontal frame 192 is present at the bottom of the front corner posts 172, and is again formed from two joists 194 extending the length of the device and two joists 196 extending the depth of the device. Wheels 112 are shown as being attached to the joists of the lower frame. A pan (not visible) may also be present within the lower horizontal frame. A cabinet 114, a compressor 116, and a motor 152 are also seen here.

Referring back to FIG. 5 and FIG. 6, the faceplate 200 may be considered to be located within a frame formed by a joist 176, two corner posts 172, and a joist 182.

In use, one of the belt assemblies is in a fixed position relative to the housing and the other belt assembly "floats" to allow the distance between the belts to be changed. For example, the first belt assembly may be fixed and the second assembly may be floating. This is useful for accommodating plant stems having different diameters, and can also be useful for removing jammed material from the interior of the device. In addition, this permits a constant force to be put on the stems without excessive strain on the motor and mechanical parts.

Figure 21:
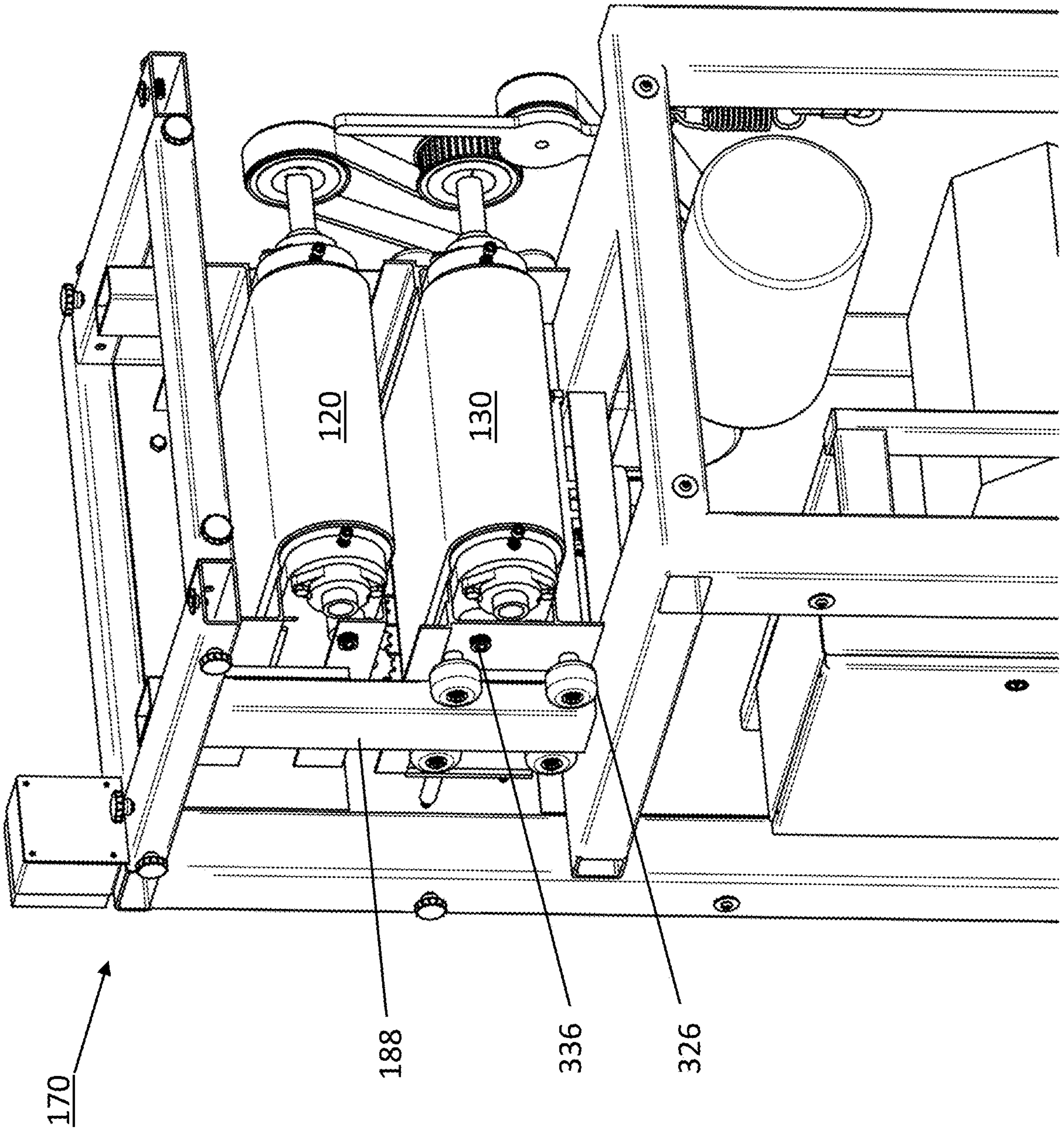
FIG. 21 is a rear perspective view showing the belt assemblies in a second position.

FIG. 20 and FIG. 21 are two different views illustrating this floating ability. FIG. 20 illustrates a first position in which the first belt assembly 120 and the second belt assembly 130 are relatively close to each other, or put another way the nip is relatively small. FIG. 21 illustrates a second position in which the first belt assembly 120 and the second belt assembly 130 are further apart from each other, or put another way the nip is larger compared to that of FIG. 20. In these two figures, the first belt assembly was fixed in place and did not move, while the second belt assembly moved downwards relative to the first belt assembly.

Figure 22:
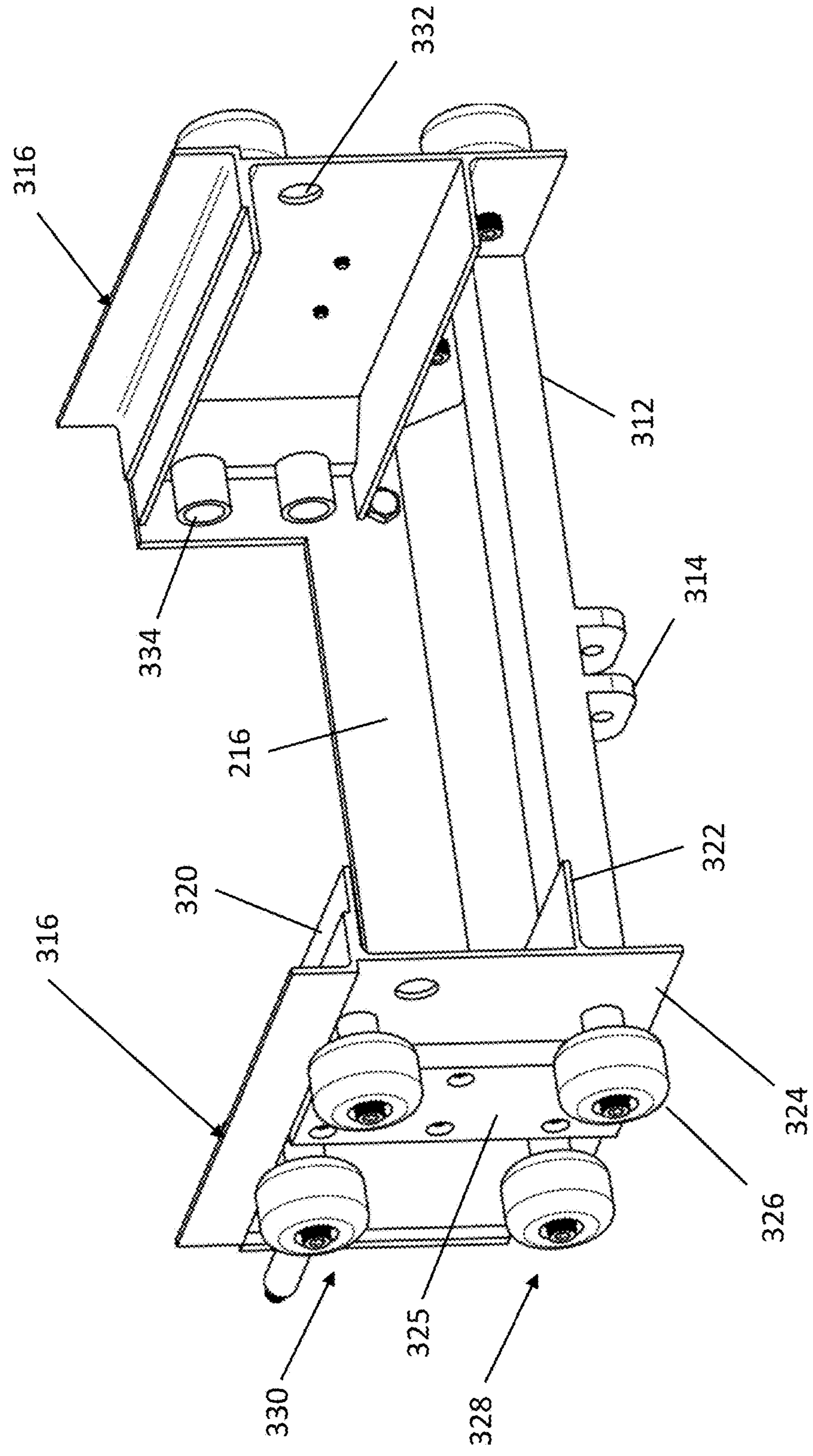
FIG. 22 is a rear perspective view of the mobile carriage frame.

The floating ability of the second belt assembly is provided by a mobile carriage frame which can travel vertically within the device frame. FIG. 22 is a rear perspective view of the mobile carriage frame 310. The mobile carriage frame includes two side rails 316 which are joined together and fixed in place relative to each other by a central crossbar 312. The central crossbar is a solid piece. The lower side of the central crossbar includes a joint 314 for attachment to a variable length tool, as will be explained further below. Each side rail 316 includes an upper surface 320, a lower surface 322, and a side surface 324. These three surfaces run from the front to the rear of the destemming device. The upper surfaces 320 and the lower surfaces 322 of the two side rails face each other, or in other words are on the internal surface of the side surfaces 324. Portions of the side surface 324 extend beyond the upper surfaces and the lower surfaces, which aids in preventing plant material from going between the belts to the side and getting stuck within the machine.

The upper surface 320 and the lower surface 322 are both located on the same side of the side surface 324, i.e. the internal side. On the opposite or external side of the side surface 324, at least two, and preferably more, guide wheels 326 are present on the outside of the mobile carriage frame. Here, four such guide wheels are shown. Within each pair of guide wheels, the guide wheels are spaced apart from each other in the depth axis, with one guide wheel closer to the front end and one guide wheel closer to the rear end. Here, there are a pair 328 of lower guide wheels and a pair 330 of upper guide wheels, the upper pair being located above the lower pair. A low-friction slide piece 325 (e.g. made of plastic) is present between the guide wheels 326. A locking hole 332 is also present in the side rail 316. Optional locating posts 334 oriented length-wise are visible on the front end of the side rails 316. Referring back to FIG. 18, these locating posts will engage the notches 128 of the belt assembly (when the optional locating posts and optional notches are present). Finally, the second backing plate 216 is attached to the front end of the side rails, closing off the front end and leaving the rear end of the mobile carriage frame open.

Figure 23:
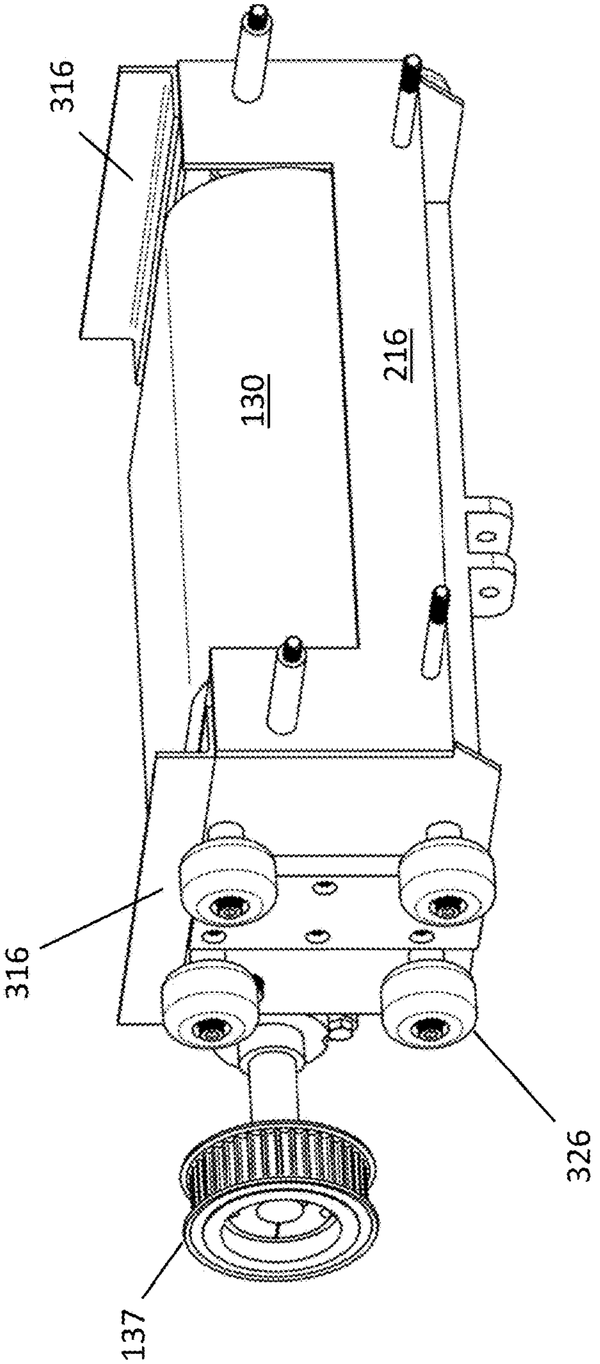
FIG. 23 is a front perspective view of the mobile carriage frame with a belt assembly inserted, and with the backing plate of the faceplate attached.

FIG. 23 is a front perspective view showing additional aspects of the mobile carriage frame 310. In this view, the second belt assembly 130 has been inserted into the rear end of the mobile carriage frame. The driven pulley 137 of the second belt assembly extends beyond the guide wheels 326 of the mobile carriage frame 310. In addition, the second backing plate 216 of FIG. 6 (to which the second support block 280 with cutting fingers 220 is attached) is also visible here attached to the side rails 316.

Referring back to FIG. 18, FIG. 21, and FIG. 22, the second belt assembly is fixed in place in the mobile carriage frame via a fastener 336, such as a bolt, which engages both the locking hole 332 of the mobile carriage frame 310 and the locking hole 129 of the second belt assembly 130. As best seen in FIG. 21, the guide wheels 326 will be located on either side of the guide piece 188, and run up-and-down along opposite external surfaces of the guide piece.

Another alternative embodiment is contemplated in which the track piece 188 is a three-sided piece and guide pieces on the external surface of the mobile carriage frame (such as the guide wheels) run up-and-down along the inside of the three-sided channel piece. It is also contemplated that multiple track pieces may be present on each side of the device frame, with the mobile carriage frame suitably modified.

Figure 24:
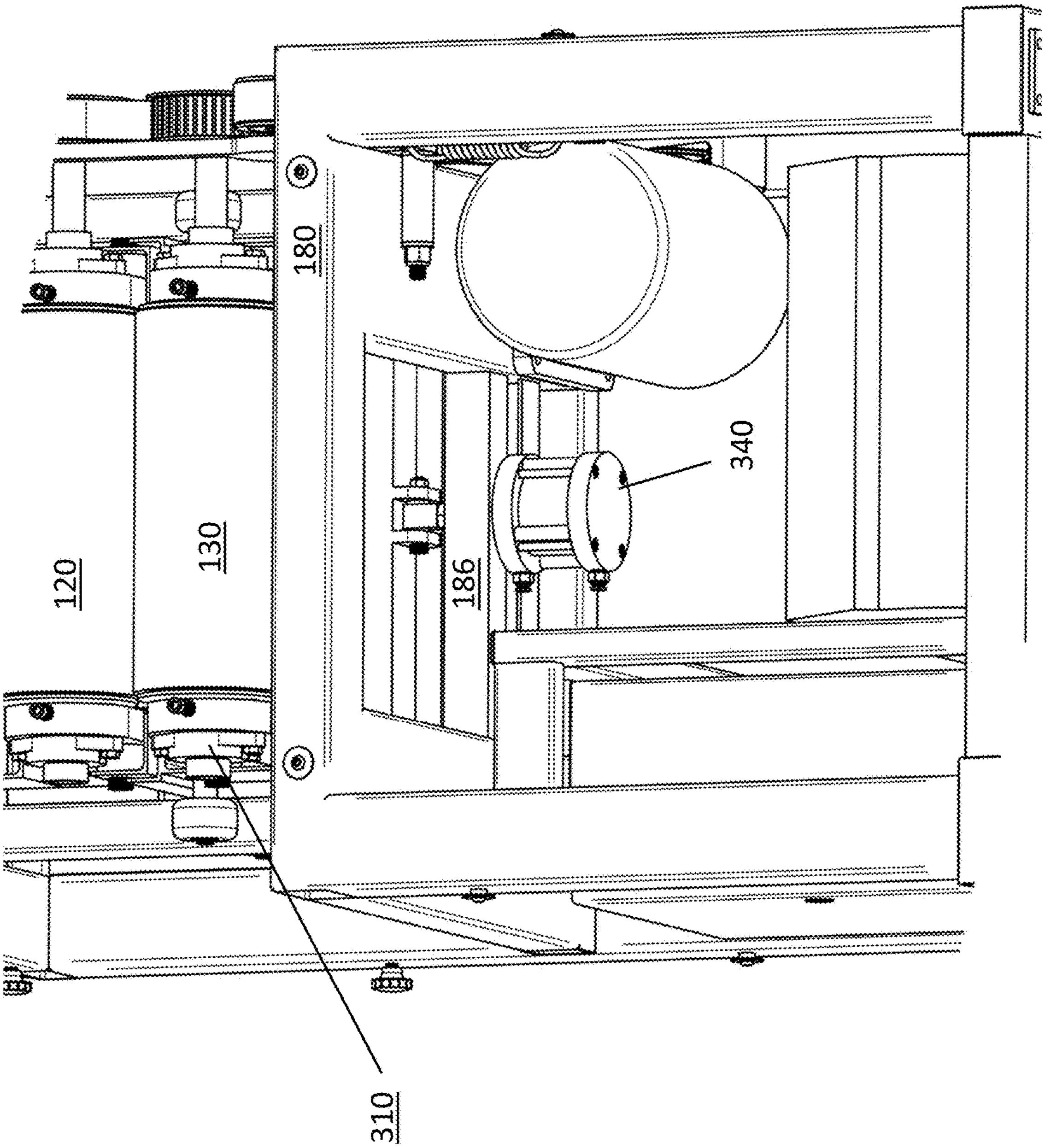
FIG. 24 is a perspective view showing the bottom of the central horizontal frame, and the fixed crossbar, and the variable length tool.

FIG. 24 is a perspective view showing the bottom of the central horizontal frame 180, and the fixed crossbar 186. Also visible here is a variable length tool 340 which is fixed to or supported by the fixed crossbar 186. The variable length tool 340 connects to the joint 314 on the lower side of the central crossbar of the mobile carriage frame (see FIG. 22). The variable length tool changes length as directed by the user/operator to move the mobile carriage frame 310, the second belt assembly 130, and the second support block 280 up and down in the height axis relative to the first belt assembly 120 or the first support block 280. The variable length tool may be, for example, a pneumatic cylinder, or a linear actuator, or even just a spring. Again, the floating ability of the second belt assembly permits adjustments to the clamping force of the two belt assemblies on a plant stem, and/or provides an easy way for removing jams from the destemming device. It is contemplated that the mobile carriage frame/second belt assembly can travel up and down for a distance of up to about 4 inches.

Figure 25:
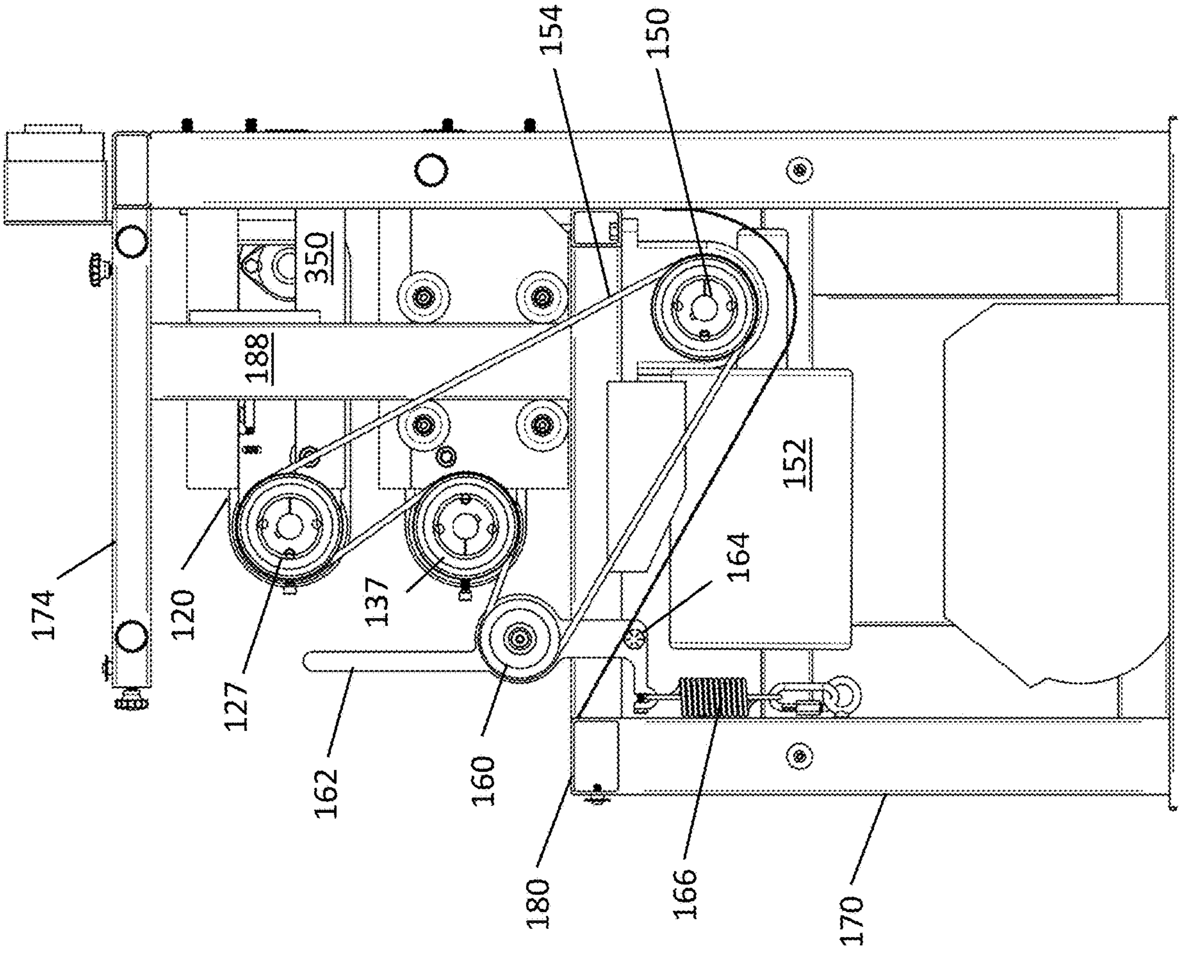
FIG. 25 is a side view of the destemming device, showing the belt assemblies and the carriage frames with a drive belt and motor.

While the second belt assembly 130 can travel using the mobile carriage frame 310, the first belt assembly is fixed in place along the track pieces. Referring to FIG. 25, the first belt assembly is inserted into a fixed carriage frame 350 which is similar to the side rails 316 of the mobile carriage frame described in FIG. 22, but does not include the central crossbar or the guide wheels. The fixed carriage frame 350 is located between the upper horizontal frame 174 and the central horizontal frame 180. The fixed carriage frame 350 is fixed in place on the track pieces 188, for example by welding. The first belt assembly 120 is also inserted into the rear end of the fixed carriage frame and locked in place in the same manner described in FIG. 22.

Continuing with FIG. 25, the driven pulleys 127, 137 of the first belt assembly and the second belt assembly are both seen here. The two driven pulleys 127, 137 are operatively connected to a drive pulley 150 by a drive belt 154. The drive pulley 150 is connected to at least one motor 152, which may be mounted beneath the housing or contained within the housing.

The drive belt 154 may be connected to one or more additional idle pulleys 160, which can increase the contact of the belt with the two driven pulleys 127, 137, and keep the belt tension at the desired level. This permits both belt assemblies to be driven by the motor. Although a belt-and-pulley system is used in the depicted embodiment, it is also possible to use a chain-and-sprocket arrangement instead.

As illustrated here, the idle pulley 160 is attached to a handle 162 with a pivot point 164 below the idle pulley itself. A spring 166 also attaches the handle to the device frame 170 on the opposite side of the pivot point from the mobile carriage frame. This permits belt tension to be adjusted manually or automatically as the mobile carriage frame moves up-and-down within the device. The handle 162 can be pushed toward to release tension for removing or installing the drive belt. The drive belt must be removed to remove the belt assemblies.

Referring now to FIG. 1, a foot pedal 158 is illustrated. The foot pedal can be used as an activation system to operate the destemming device/bucker. When the foot pedal is not depressed, the destemming machine is turned off. The belt assemblies will not operate, and the cutting fingers are locked in an open position (see FIG. 21). When the foot pedal is engaged or pushed down, power will flow through the device, and the mobile cassette frame can move to engage the plant stem.

Some variations in the structures described herein have also been considered.

Initially, referring back to FIG. 5, two sets of cutting fingers 220 on opposing support blocks 280, 281 are shown. Embodiments are also contemplated that have only one set of cutting fingers (e.g. either the set on first support block 280 or the set on second support block 281). The second set of cutting fingers can be replaced with any suitable surface that can also cut or scrape off plant material, such as a flat piece of metal.

Referring to FIGS. 8A-8C, the base 230 of the cutting finger is tapered. Generally, the base may have any suitable shape. In some other embodiments, the base 230 may simply have a cuboidal shape, i.e. only have six faces. It is contemplated that only one travel shaft may be present. It is also contemplated that the teeth on the cutting member of a given cutting finger may have the same or different tooth depth or tooth pitch. The cutting members 260 of the plurality of cutting fingers may all be the same, or may vary from each other independently in terms of shape, number of teeth, diameter, tooth depth, tooth pitch, etc. For example, the cutting member may have a circular shape, a polygonal shape, a triangular shape, a rectangular or cubic shape, an octagonal shape, or other complex geometry, etc.

Referring also to FIG. 7, the compression spring 296 is on the far side of the support block 280 from the cutting finger 220. It is contemplated that the compression spring could be located around the travel shaft and be located on the near side, between the cutting finger 220 and the support block 280 itself. Referring to FIG. 5 and FIG. 6, the cutting edge/rotating disk 222 is located to the rear of the cutting finger, or put another way the plant stem must pass by the base 230 before encountering the cutting edge. It is also contemplated that the cutting edge could be located to the front of the cutting finger.

As illustrated in the present figures, the mobile cassette frame 310 and the second belt assembly 130 move vertically. It is contemplated that the mechanism may be turned in any direction, for example horizontally or diagonally at any angle, such that the cutting fingers would move in a different axis. As illustrated in FIG. 5, the cutting fingers move vertically. It is also contemplated that the support block/cutting fingers could be angled inwards or outwards relative to the faceplate.

Another embodiment is contemplated in which the device is adapted for mounting to another vehicle, for example as an attachment to a tractor or a skid steer. Power could be provided to the destemming device via a power take-off from the other vehicle. In these embodiments, it is contemplated that the destemming device could be brought to the plant, rather than moving the plant to the device. The cutting fingers and the cutting aperture would be oriented horizontally upon a faceplate or frame. The faceplate would be lowered over the plant down to the base of the plant. The destemming device would then be lifted and move up the length of the plant, removing any leaves and/or buds. In such an embodiment, the belt assemblies would not be needed. The first support block 280 and the second support block 281 having the cutting fingers would be attached together in a manner so as to be able to move relative to each other and change the size of the cutting aperture, for example within a frame or a track, or mounted upon backing plates. Power would be provided for changing the size of the cutting aperture, for example, by moving one or both of the support blocks 280, 281 or their backing plates within the frame or track.

The belt system may be powered by one or more motors 152 or manually (e.g., with a hand crank). Power may be provided to the motor(s) directly or via a control unit 156. In some embodiments, the control unit includes an on/off switch or button, an emergency stop switch or button, and a dial or other variable input for controlling the frequency of the AC power that is sent to the motor(s). This in turn controls the speed. The control unit may be located on the front of the destemming device. It is also possible that the control unit user interface is a touchscreen.

It is expressly contemplated that the power used to operate the destemming device and its various components may be provided from a renewable energy source. In some embodiments, the renewable energy source is solar power. In other embodiments, the renewable energy source is wind power.

In the embodiments depicted in the drawings, the housing/device frame includes four square corner posts or legs, and the device overall has a square shape. However, it is also contemplated that different numbers (e.g., 1, 2, 3, 5, 6, etc.) or cross-sectional shapes (e.g., circular, triangular, rectangular, pentagonal, hexagonal, other polygonal, irregular, etc.) for the legs may be used. Similarly, the device may have other shapes, (e.g., circular, triangular, rectangular, pentagonal, hexagonal, other polygonal, irregular, etc.). Four wheels are illustrated, but generally a plurality (e.g., 4, 6, etc) of optionally lockable wheels may be used. The wheels may be standard or large all terrain casters and may be bolted on.

Screws and other types of fasteners may be used to connect the various parts of the device, such as the faceplate, the housing, etc.

The destemming devices of the present disclosure may include one or more removable covers for the housing. In some embodiments, the one or more removable covers include a top cover and two side covers. The two side covers may be detachably associated with the housing via magnets (e.g., four magnets for each side cover—one associated with each corner of the side cover). The magnets may be located on the side cover, on the housing, or on both the side cover and the housing. In some embodiments, the rear of the housing is uncovered to allow the belt system to eject stems from the back of the device.

The side cover panels may interlock with switches when fully installed. The top cover may hold the side covers in place if they do not have their own latching mechanism. The top side of the side cover panels may be held to the frame/housing via teardrop holes that fit over fasteners (e.g., screws). In some embodiments, the cover panels are made of aluminum or plastic. The cover panels may have a thickness of from about 1/32 inches to about 1/4 inches, including about 1/8 inches. The top cover panel may be curved and may be secured to the frame/housing via hooks on the backside and latches on the front side. A switch associated with the front latch may render the machine inoperable when the top cover panel is removed.

Devices which include only one belt assembly and an alternative structure is used instead of a second belt assembly are also contemplated. Examples of alternative structures include one roller or a plurality of rollers without a belt, or the like. In such structures, a nip is created between the one belt assembly and the roller(s).

The destemming devices of the present disclosure advantageously reduce the length of stem that must be inserted into the machine. For example, the length of stem material that must be inserted into the cutting aperture and grasped by the belt system may be as small as about 1 inch, about 1.5 inches, about 2 inches, about 2.5 inches, or about 3 inches. Of note, the plant stem does not need to be pre-stripped (or in other words a minimum bare stem length is not needed) because the cutting aperture can completely open and so there is no minimum required bare length, and thus little risk of bud loss by placing the stem directly into the machine.

The belt system also facilitates a longer contact zone instead of the smaller point contacts for the large conventional rollers. In some embodiments, the belt system is configured to grip the plant stem over a length of at least 2 inches, at least 3 inches, at least 4 inches, or at least 5 inches. The larger gripping length facilitates an increase in pulling power.

It should be understood that different aspects of the various different embodiments can be combined together, and such combinations are expressly contemplated.

The various components of the destemming device are made from suitable materials. The housing and device frame may be made of the same or different materials. Non-limiting examples of suitable materials include powder coated steel, aluminum, iron, and stainless steel. Aluminum and magnesium castings are also contemplated. Injection molded plastic frames are also contemplated.

The metal component(s) of the belt assemblies may be made of stainless steel or other corrosion-resistant material (e.g., another corrosion-resistant alloy or metal, plastic, etc.). Non-limiting examples of suitable roller materials include anodized aluminum, rubber, stainless steel, and plastic.

The belts themselves may be made of rubber, such as natural rubber or a synthetic rubber. Non-limiting examples of synthetic rubbers include isoprene rubber, butadiene rubber, chloroprene rubber, (optionally halogenated) butyl rubber, styrene-butadiene rubber, (optionally hydrogenated) nitrile rubber, ethylene propylene rubber, ethylene propylene diene rubber, epichlorohydrin rubber, polyacrylic rubber, fluorosilicone rubber, fluoroelastomers, perfluoroelastomers, polyether block amides, chlorosulfonated polyethylene, and ethylene-vinyl acetate rubber. The rubber is optionally reinforced with one of more fillers. Non-limiting examples of fillers include fibers such as aramid fibers, carbon fibers, and glass fibers.

Methods for destemming plant matter (e.g., hemp, cannabis) are also disclosed. The methods include feeding plant matter stem-first through a cutting aperture as described above. The plant stem engages a belt system as described. To do so, the lower belt assembly is lowered, then raised back up to engage the plant stem. The belt system grips and pulls the stem through the interior of the device. As the stem is pulled, the cutting fingers around the cutting aperture cut the desired plant matter (e.g., buds) away from the stem. The desired plant matter may drop into a retention device (located on the exterior of the device) beneath the cutting aperture and be recovered. The stem may be ejected by the belt system through the back of the device and discarded. The stems at the backside and/or the destemmed plant matter at the front side may be filtered for size (e.g., using a plurality of layers of decreasing size hardware cloth grids). The size filters may be placed above or in a bin.

The following examples are provided to illustrate various aspects of the devices, components, and methods of the present disclosure. The examples are merely illustrative and are not intended to limit the disclosure to the materials, conditions, or process parameters set forth therein.

EXAMPLE

Figure 26:
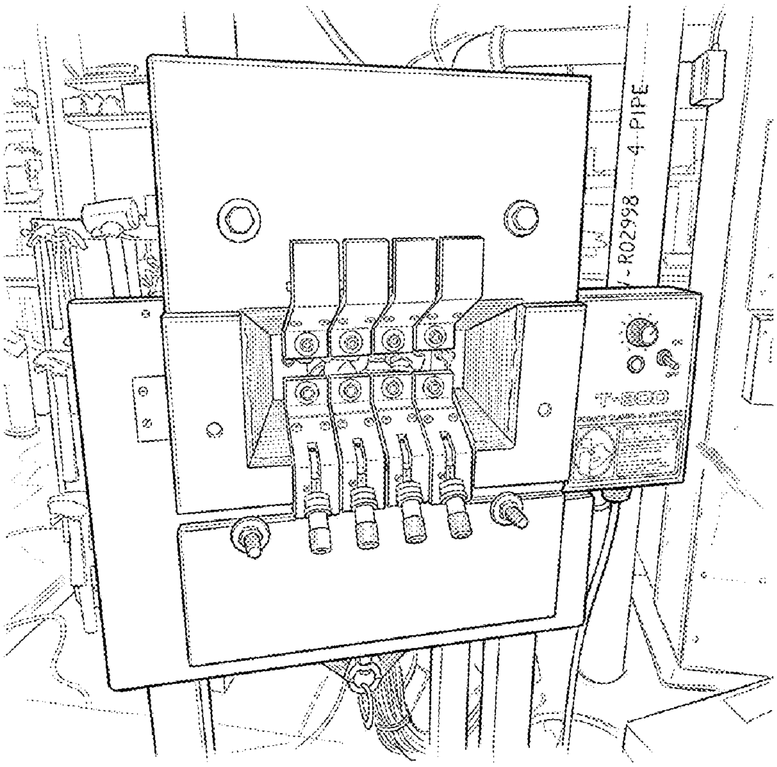
FIG. 26 is a front view of a prototype device with cutting fingers as described herein.
Figure 27:
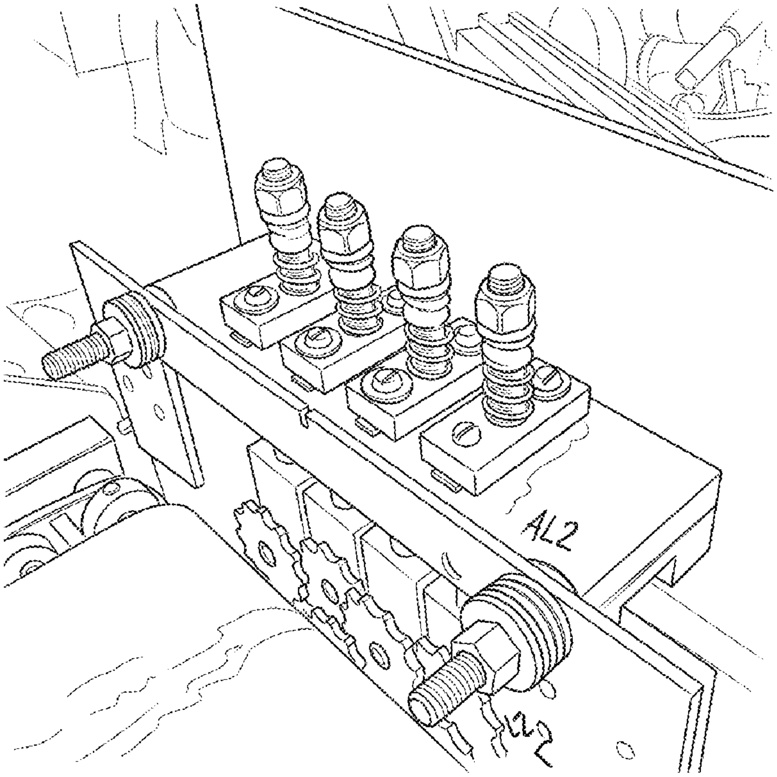
FIG. 27 is a top perspective view of the cutter assembly of the prototype.
Figure 28:
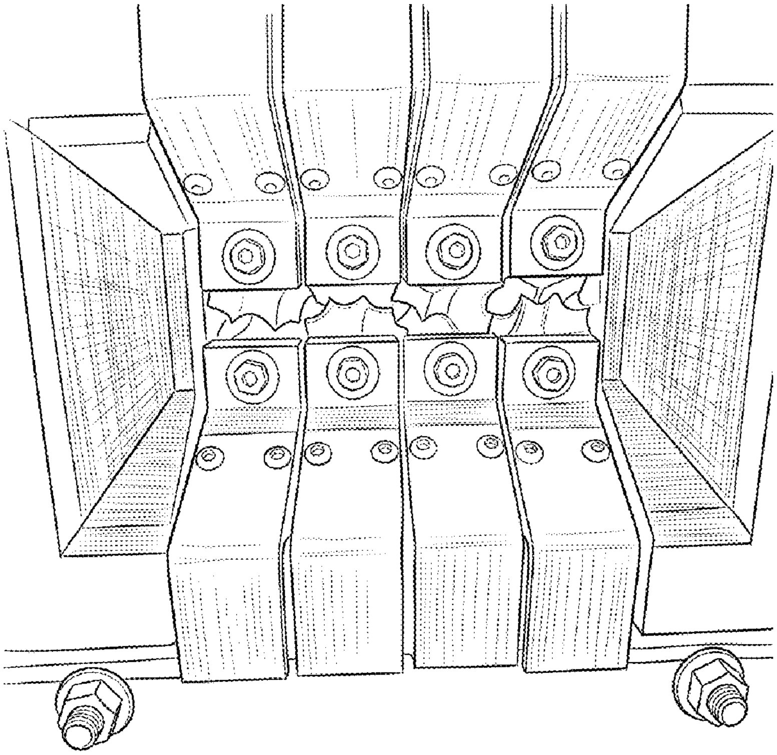
FIG. 28 is a magnified front view of the prototype.
Figure 29:
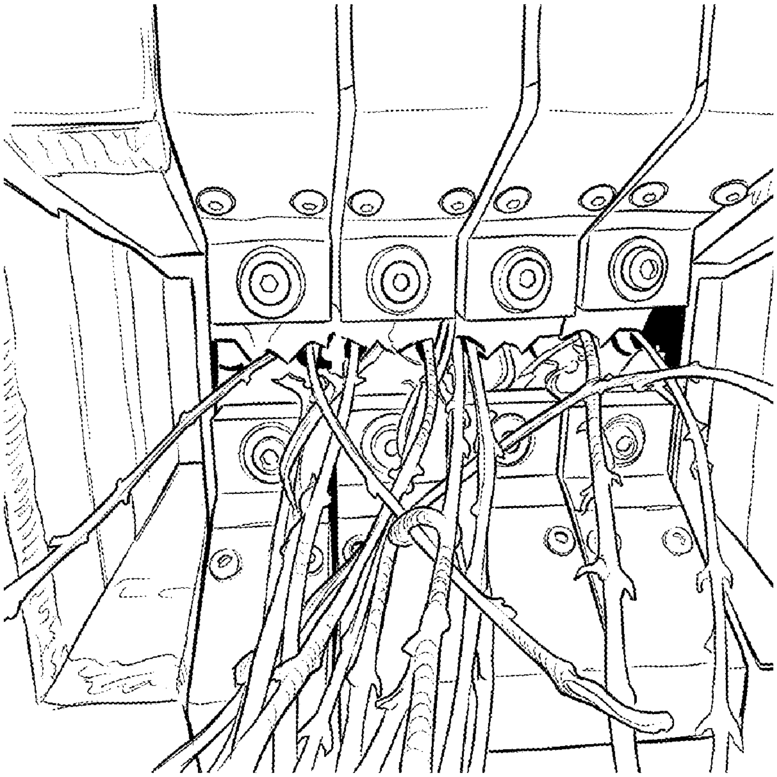
FIG. 29 is a magnified front view of the prototype, showing branches running through the prototype.

A prototype was constructed. FIGS. 26-29 are pictures of the prototype. FIG. 26 shows a front view of the prototype. FIG. 27 is a top perspective view of the cutter assembly. FIG. 28 is a magnified front view, showing the rotating disks and the cutting aperture. FIG. 29 is a magnified front view showing branches running through the prototype.

The present disclosure has been described with reference to exemplary embodiments. Modifications and alterations will occur to others upon reading and understanding the preceding detailed description. It is intended that the present disclosure be construed as including all such modifications and alterations insofar as they come within the scope of the appended claims or the equivalents thereof.

The invention claimed is:

1. A destemming device comprising:

a housing;

a first support block having a plurality of cutting fingers attached thereto; and a second support block spaced apart from the first support block and also having a plurality of cutting fingers attached thereto;

wherein each cutting finger comprises a base and at least one cutting edge, and is spring-mounted so as to be able to travel relative to the first support block or the second support block; and wherein the plurality of cutting fingers on the first support block and the plurality of cutting fingers on the second support block form a cutting aperture; and wherein the at least one cutting edge of each cutting finger is present on a rotating member attached to the base, the member rotating on an axis that passes through the cutting aperture, and the member extending beyond the base.

2. The destemming device of claim 1, wherein:

each cutting finger further comprises:

a plurality of travel shafts extending from the base; and a cross bar joining the plurality of travel shafts, the cross bar being spaced apart from the base and including a spring mount aperture; and wherein the first support block or the second support block further comprises, for each given cutting finger in the plurality of cutting fingers:

a plurality of corresponding rail apertures through which the plurality of travel shafts of the given cutting finger passes, such that the base and the cross bar of the given cutting finger are on opposite sides of the first support block or the second support block;

a corresponding spring mount which passes through the spring mount aperture of the given cutting finger;

a corresponding compression spring around the corresponding spring mount; and a corresponding spring cap joined to the distal end of the corresponding spring mount;

such that the given cutting finger floats relative to the first support block or the second support block.

3. The destemming device of claim 2, wherein each cutting finger further comprises a guard extending from the base in the same direction as the plurality of travel shafts.

4. The destemming device of claim 2, wherein the first support block or the second support block further comprises, for each given cutting finger in the plurality of cutting fingers, a corresponding collar placed between the corresponding spring and the corresponding spring mount.

5. The destemming device of claim 1, wherein the rotating member comprises a plurality of square teeth; or wherein the rotating member of adjacent cutting fingers are offset from each other and overlap to form openings.

6. The destemming device of claim 1, wherein the first support block and the second support block are placed such that the pluralities of cutting fingers float vertically; or wherein the cutting edges on the first support block and the second support block are recessed relative to the housing; or wherein the first support block is fixed in place relative to the housing, and the second support block floats relative to the housing.

7. The destemming device of claim 1, further comprising a belt system configured to fit within the housing, the belt system comprising:

a first belt assembly comprising a first gripper belt; and a second belt assembly comprising a second gripper belt; and at least one motor that is operatively connected to rotate the first gripper belt and the second gripper belt.

8. The destemming device of claim 7, wherein the first support block is fixed in place relative to the first belt assembly, or wherein the second support block is fixed in place relative to the second belt assembly.

9. The destemming device of claim 7, wherein the second support block and the second belt assembly are attached to a mobile carriage frame which floats relative to the first belt assembly.

10. The destemming device of claim 9, wherein the housing further comprises a device frame having a plurality of channels that guide the mobile carriage frame.

11. The destemming device of claim 10, wherein the device frame includes a fixed crossbar, the fixed crossbar supporting a variable length tool for moving the mobile carriage frame relative to the first belt assembly.

12. The destemming device of claim 11, wherein the variable length tool comprises a pneumatic cylinder, or a spring, or a linear actuator.

13. The destemming device of claim 7, further comprising an activation system for increasing the distance between the first belt assembly and the second belt assembly.

14. The destemming device of claim 13, wherein the activation system comprises a foot pedal operatively connected to the second belt assembly, wherein depressing the foot pedal causes the second belt assembly to move towards the first belt assembly.

15. The destemming device of claim 1, wherein:

each cutting finger further comprises a travel shaft extending from the base; and wherein the first support block or the second support block further comprises, for each given cutting finger in the plurality of cutting fingers:

a corresponding rail aperture through which the travel shaft of the given cutting finger passes;

a corresponding compression spring surrounding the travel shaft; and a corresponding spring cap joined to a distal end of the corresponding travel shaft.

16. A method of using a destemming device, the method comprising:

feeding a plant stem through the cutting aperture of the destemming device of claim 1;

wherein a belt system pulls the plant stem through the cutting aperture and the cutting aperture removes buds from the plant stem.

17. A destemming device comprising:

a housing;

a first support block having a plurality of cutting fingers attached thereto; and a cutting surface spaced apart from the first support block;

wherein each cutting finger comprises a base and at least one cutting edge, and is spring-mounted so as to be able to travel relative to the first support block; and wherein the plurality of cutting fingers on the first support block and the cutting surface form a cutting aperture; and wherein the at least one cutting edge of each cutting finger is present on a rotating member attached to the base, the rotating member rotating on an axis that passes through the cutting aperture, the axis also passing through a center of the rotating member, the rotating member rotating in a plane normal to the axis, and the at least one cutting edge extending beyond the base.

18. The destemming device of claim 17, wherein the cutting surface is a flat metal piece, or is a second support block having a plurality of cutting fingers attached thereto.

19. A destemming device comprising:

a housing; and a support block having a plurality of cutting fingers attached thereto;

wherein each cutting finger is spring-mounted so as to be able to travel relative to the support block;

wherein each cutting finger comprises a base and a cutting member, wherein the cutting member has at least one cutting edge, the cutting member rotating on an axis that passes through a cutting aperture, the axis also passing through a center of the cutting member, the cutting member rotating in a plane normal to the axis, and wherein the at least one cutting edge extends beyond a lower end of the base.

20. The destemming device of claim 19, wherein the cutting members of adjacent cutting fingers are offset from each other in the front-to-rear axis and overlap in a horizontal axis.

* * * * *